(12) United States Patent
Xue et al.

(10) Patent No.: US 11,991,708 B2
(45) Date of Patent: May 21, 2024

(54) INFORMATION TRANSMISSION METHOD AND COMMUNICATIONS APPARATUS

(71) Applicant: HUAWEI TECHNOLOGIES CO., LTD., Shenzhen (CN)

(72) Inventors: Lixia Xue, Beijing (CN); Zheng Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 480 days.

(21) Appl. No.: 17/245,518

(22) Filed: Apr. 30, 2021

(65) Prior Publication Data

US 2021/0250980 A1 Aug. 12, 2021

Related U.S. Application Data

(63) Continuation of application No. PCT/CN2019/115161, filed on Nov. 1, 2019.

(30) Foreign Application Priority Data

Nov. 2, 2018 (CN) .......................... 201811302951.9
Jan. 11, 2019 (CN) .......................... 201910028472.0

(51) Int. Cl.
*H04W 72/23* (2023.01)
*H04W 76/28* (2018.01)

(52) U.S. Cl.
CPC ........... *H04W 72/23* (2023.01); *H04W 76/28* (2018.02)

(58) Field of Classification Search
CPC . H04W 36/24; H04W 4/021; H04W 52/0216; H04W 52/0212; H04W 24/02;

(Continued)

(56) References Cited

U.S. PATENT DOCUMENTS 8,972,762 B2    3/2015 Deluca
11,653,292 B2*  5/2023 Azizi .................. H04W 68/005
                                                          370/329

(Continued)

FOREIGN PATENT DOCUMENTS

CN    101483884 A    7/2009
CN    101965037 A    2/2011

(Continued)

OTHER PUBLICATIONS

T.-K. Le, U. Salim and F. Kaltenberger, "Strategies to meet the configured repetitions in URLLC Uplink Grant-Free transmission," 2019 16th International Symposium on Wireless Communication Systems (ISWCS), Oulu, Finland, 2019, pp. 597-601, doi: 10.1109/ISWCS.2019.8877344. (Year: 2019).*

(Continued)

*Primary Examiner* — William D Cumming
(74) *Attorney, Agent, or Firm* — Rimon PC

(57) ABSTRACT

A terminal device receives first downlink control information (DCI) sent by a network device, where the first DCI carries first indication information and second indication information. The first indication information is used to indicate data transmission, and the second indication information is used to indicate an operation mode of an inactivity timer in discontinuous reception (DRX). The terminal device determines an operation mode of the inactivity timer based on the second indication information.

20 Claims, 9 Drawing Sheets

(58) Field of Classification Search
CPC . H04W 76/14; H04W 76/27; H04W 52/0236; H04W 68/005
USPC .......................................................... 370/329
See application file for complete search history.

(56) References Cited

U.S. PATENT DOCUMENTS

| | | |
|---|---|---|
| 2017/0318566 A1 | 11/2017 | Deogun et al. |
| 2018/0220345 A1* | 8/2018 | Moon .................... H04W 76/27 |
| 2019/0208436 A1* | 7/2019 | Zhou .................... H04B 17/309 |
| 2019/0364492 A1* | 11/2019 | Azizi .................... H04W 76/14 |
| 2020/0389873 A1* | 12/2020 | Liu ....................... H04W 72/12 |
| 2021/0250980 A1* | 8/2021 | Xue .................. H04W 52/0216 |

FOREIGN PATENT DOCUMENTS

| | | | | |
|---|---|---|---|---|
| CN | 102625432 A | 8/2012 | | |
| CN | 104782218 A | 7/2015 | | |
| CN | 105722195 A | 6/2016 | | |
| CN | 106034318 A | 10/2016 | | |
| CN | 108307507 A | 7/2018 | | |
| CN | 108307547 A | 7/2018 | | |
| CN | 108476472 A | 8/2018 | | |
| CN | 108616969 A | 10/2018 | | |
| EP | 3869874 A1 * | 8/2021 | ........ | H04W 52/0212 |
| EP | 4080929 A1 * | 10/2022 | ............ | H04W 24/02 |
| WO | 2014109769 A1 | 7/2014 | | |
| WO | WO-2020088680 A1 * | 5/2020 | ........ | H04W 52/0212 |

OTHER PUBLICATIONS

Huawei, HiSilicon, General considerations on UE power saving in Rel-16. 3GPP TSG RAN WG1 Meeting #94, Gothenburg, Sweden, Aug. 20-24, 2018, R1-1809333, 5 pages.

* cited by examiner

INFORMATION TRANSMISSION METHOD AND COMMUNICATIONS APPARATUS

CROSS-REFERENCE TO RELATED APPLICATIONS

This application is a continuation of International Application No. PCT/CN2019/115161, filed on Nov. 1, 2019, which claims priority to Chinese Patent Application No. 201811302951.9, filed on Nov. 2, 2018 and Chinese Patent Application No. 201910028472.0, filed on Jan. 11, 2019. All of the aforementioned patent applications are hereby incorporated by reference in their entireties.

TECHNICAL FIELD

This application relates to the field of communications technologies, and in particular, to an information transmission method and a communications apparatus.

BACKGROUND

To reduce power consumption of a terminal device, a discontinuous reception (DRX) mechanism is introduced in wireless communications systems such as a long term evolution (LTE) system. Because power consumption overheads of a terminal device are mainly concentrated on blind detection of a physical downlink control channel (PDCCH), the DRX mechanism may enable the terminal device to periodically enter a sleep state (or referred to as a sleep mode or an off mode) without performing blind detection on the PDCCH and to wake up from the sleep state when blind detection needs to be performed. In this way, power consumption of the terminal device can be reduced as much as possible, thereby saving power.

After the terminal device wakes up from the sleep state, the terminal device continuously performs blind detection on the PDCCH in a period of time. This process still has relatively high power consumption. Therefore, if this part of power consumption overheads can be reduced while ensuring PDCCH detection performance, power consumption of the terminal device can be further reduced and the terminal device's battery life can be prolonged.

SUMMARY

Embodiments of this application provide an information transmission method and a communications apparatus, to reduce power consumption of a terminal device.

According to a first aspect, an information transmission method is provided. The method may be performed by a terminal device. In the method, the terminal device receives first DCI sent by a network device, and determines an operation mode of an inactivity timer in DRX based on an indication of the first DCI. The first DCI carries first indication information and second indication information, the first indication information is used to indicate data transmission, and the second indication information is used to indicate the operation mode of the inactivity timer.

In this solution, the operation mode of the inactivity timer may be explicitly indicated by the second indication information carried in the first DCI. The terminal device may determine a specific operation mode of the inactivity timer after receiving the first DCI, unlike a current technology in which the inactivity timer is restarted to restart timing as long as DCI used to indicate data transmission is received. In this way, an implicit indication function in the current technology that the DCI used to indicate data transmission definitely corresponds to timing starting or timing resetting and then timing restarting of the inactivity timer can be decoupled, and scheduling flexibility can be improved by using different operation modes of the inactivity timer. For example, the network device may indicate, when an amount of remaining data that needs to be transmitted decreases, an operation mode of continuing timing by keeping a current timing value, or may indicate, when no data needs to be transmitted, an operation mode of stopping timing. In this way, scheduling flexibility and power consumption of the terminal device can be balanced as much as possible, and power consumption of the terminal device can be reduced as much as possible while ensuring timely and effective data transmission, so that power of the terminal device can be saved and a device battery life of the terminal device can be prolonged.

In a possible design, the operation mode of the inactivity timer includes any one of the following: starting timing, stopping timing, resetting timing, and continuing timing.

In this solution, a plurality of operation modes of the inactivity timer are configured, so that the network device can indicate a corresponding operation mode of the inactivity timer to the terminal device based on an amount of data that needs to be transmitted, thereby improving flexibility of a timing operation of the inactivity timer. In this way, timely data transmission and low power consumption of the terminal device is further balanced, and power consumption of the terminal device is reduced as much as possible while ensuring timely and effective data transmission.

In a possible design, the second indication information is explicitly indicated in the first DCI, and the first DCI is used to schedule new data transmission or data retransmission.

In a possible design, an NDI field in the first DCI carries the first indication information, and a field in the first DCI other than the NDI field carries the second indication information.

In the foregoing solution, in the solution of explicitly indicating the operation mode of the inactivity timer in the DCI used to indicate data transmission, an implicit indication function in the current technology that the DCI indicating data transmission definitely corresponds to restarting of the inactivity timer to restart timing can be decoupled. For example, an implicit indication function in the current technology that the inactivity timer is definitely started when the NDI indicates new data transmission can be decoupled. In other words, the explicit indication of the operation mode of the inactivity timer by using the second indication information may overwrite a function of implicitly indicating, by the NDI, to start or not start the inactivity timer.

In a possible design, when the first DCI is used to schedule new data transmission, the second indication information indicates that the operation mode of the inactivity timer is continuing timing, stopping timing, or starting timing; or when the first DCI is used to schedule data retransmission, the second indication information is used to indicate that the operation mode of the inactivity timer is resetting timing, stopping timing, or starting timing.

When the NDI field in the first DCI indicates new data transmission or data retransmission, the corresponding second indication information may explicitly indicate the foregoing specific operation mode of the inactivity timer. In comparison with an existing manner of implicitly indicating, by using the NDI, the inactivity timer to start timing or reset timing, flexibility of indicating a timing operation of the inactivity timer can be improved. In this way, scheduling flexibility and power consumption of the terminal device is balanced as much as possible, and power consumption of the terminal device can be reduced as much as possible while ensuring timely and effective data transmission, so that power of the terminal device is saved and a device battery life of the terminal device is prolonged.

In a possible design, the second indication information is used for indication based on whether a value of a field in the first DCI is the same as a value of the field in a previous piece of DCI of the first DCI. If the values are the same, the second indication information indicates that the operation mode of the inactivity timer is stopping timing or continuing timing, and if the values are different, the second indication information indicates that the operation mode of the inactivity timer is starting timing or resetting timing; or if the values are the same, the second indication information indicates that the operation mode of the inactivity timer is starting timing or resetting timing, and if the values are different, the second indication information indicates that the operation mode of the inactivity timer is stopping timing or continuing timing.

In the foregoing solution, the operation mode of the inactivity timer may be indicated based on whether a field used to carry the second indication information is inverted. The inversion herein is whether a value of the field changes in comparison with a value of the field in a previous piece of DCI of the first DCI, for example, whether 0 changes to 1 or whether 1 changes to 0. For example, one field is newly added based on an existing DCI format, and the operation mode of the inactivity timer is indicated based on whether a value of the newly added field is the same as a value of the field in the previous piece of DCI of the first DCI.

In a possible design, for a plurality of pieces of continuously transmitted DCI including the first DCI, a quantity of times of consecutive and repeated sending having a same value as the field in the first DCI is greater than or equal to a predetermined threshold, and the predetermined threshold is an integer greater than or equal to 2.

In a possible design, after determining the operation mode of the inactivity timer based on the indication of the first DCI, the terminal device may control the inactivity timer to perform a timing operation based on the operation mode indicated by the first DCI.

In this solution, the terminal device may adjust the operation mode of the inactivity timer based on an indication of the network device, to implement same perception as the network device.

In a possible design, a format of the first DCI is any one of format 0_0, format 0_1, format 1_0, and format 1_1. When the format of the first DCI is format 0_0, format 1_0, or format 1_1, a CRC bit of the first DCI is scrambled by a C-RNTI or a CS-RNTI; and when the format of the first DCI is format 0_1, the CRC bit of the first DCI is scrambled by a C-RNTI, a CS-RNTI, or an SP-CSI-RNTI.

Because DCI in the foregoing format is used to indicate uplink or downlink data scheduling, the DCI is suitable to explicitly indicate, by using second information, whether to start or restart the inactivity timer for timing during the uplink or downlink data scheduling. In addition, only the foregoing DCI format corresponding to the foregoing scrambling RNTI is used to send the second indication information because these corresponding RNTIs are under control of a PDCCH detection regulation of DRX but the foregoing DCI formats scrambled by other RNTIs are not restricted by the PDCCH detection regulation of DRX, and therefore no additional field overhead is required. In this way, overheads can be reduced. Therefore, DCI overheads can be reduced as much as possible by configuring the foregoing listed scrambling manner.

In a possible design, the terminal device receives, in a DRX active time, the first DCI sent by the network device.

In the foregoing solution, the DRX active time is a process in which the terminal device is in an active state, or in other words, a time length corresponding to the active state. The terminal device may detect the first DCI, so that missed detection due to the terminal device not detecting a PDCCH can be avoided.

In a possible design, the terminal device receives, in a timing process of a HARQ round trip time timer, the first DCI sent by the network device.

The first DCI is transmitted in the timing process of the HARQ round trip time timer, so that the terminal device can more quickly detect retransmission scheduling, thereby reducing a retransmission delay.

In a possible design, the first DCI further carries third indication information, the third indication information is used to indicate a total timing value of the inactivity timer, and the total timing value indicated by the third indication information is one of a plurality of total timing values configured by the network device for the terminal device.

In this solution, the network device may configure a plurality of total timing values for the inactivity timer in the terminal device. The total timing value of the inactivity timer is an inactivity timer value. When the total timing value is reached during timing of the inactivity timer, the terminal device enters an off state. Therefore, different total timing values of the inactivity timer mean that different times of reaching the off state are configured. In this way, the network device may adaptively select different total timing values based on an amount of data that needs to be currently transmitted, and then configure the different total timing values for the inactivity timer in the terminal device by using the third indication information. In this way, timely data transmission and low power consumption of the terminal device can be further balanced, and power consumption of the terminal device can be reduced as much as possible while ensuring timely and effective data transmission.

In a possible design, when the total timing value indicated by the third indication information is less than or equal to a timed value of the inactivity timer, it indicates that timing of the inactivity timer expires.

Generally, that the total timing value indicated by the third indication information is less than or equal to the timed value of the inactivity timer should be understood as an incorrect indication because such an indication is illogical. However, if this is understood as an incorrect logic indication, abnormal running of the inactivity timer may be caused. Therefore, in this solution, when the foregoing incorrect logic indication appears, it may be understood that timing of the inactivity timer expires, and a system may tolerate the foregoing incorrect logic indication. In this way, a fault tolerance capability of the system can be improved, and normal running of the inactivity timer can be further ensured, thereby improving reliability and stability of the system. In a possible design, the total timing value indicated by the third indication information is less than a current total timing value of the inactivity timer. In other words, a total timing value reconfigured by the network device is less than the current total timing value of the inactivity timer.

In this solution, when the total timing value reconfigured by the network device is less than the current total timing value of the inactivity timer, a time of reaching the off state can be shortened as much as possible, so that the terminal device can enter the off state in advance as soon as possible, thereby reducing power consumption of the terminal device as much as possible. In a possible design, the second indication information and/or the third indication information are/is indicated in any one of the following manners: the second indication information and the third indication information are separately indicated by using different fields; or the second indication information is jointly indicated by using different fields; or the third indication information is jointly indicated by using different fields; or the second indication information and the third indication information are both indicated by using a value of one field; or the second indication information and the third indication information are separately indicated by using different bits in one field.

In this solution, a plurality of manners of indicating the second indication information and the third indication information are provided, to improve indication flexibility, and flexibly use a field and a bit in the first DCI based on an actual situation, thereby enhancing applicability of the solution. In a possible design, the first DCI further carries fourth indication information, and the fourth indication information is used to indicate a timed value of the inactivity timer.

In this solution, the network device may configure a plurality of timed values for the inactivity timer in the terminal device, and the timed values of the inactivity timer mean that different times of reaching the off state are configured. In this way, the network device may adaptively select different total timing values based on an amount of data that needs to be currently transmitted, and then configure the different total timing values for the inactivity timer in the terminal device by using the fourth indication information. In this way, timely data transmission and low power consumption of the terminal device can be further balanced, and power consumption of the terminal device can be reduced as much as possible while ensuring timely and effective data transmission. In a possible design, the timed value includes a quantity of time units or a timed proportion value, and the timed proportion value is used to indicate a proportion of the total timing value of the inactivity timer.

In this solution, the timed value may be expressed in different manners, thereby improving flexibility of the solution.

In a possible design, when the timed value indicated by the fourth indication information is greater than or equal to the total timing value of the inactivity timer, it indicates that timing of the inactivity timer expires.

Generally, that the timed value indicated by the fourth indication information is greater than or equal to the total timing value of the inactivity timer should be understood as an incorrect indication because such an indication is illogical. However, if this is understood as an incorrect logic indication, abnormal running of the inactivity timer may be caused. Therefore, in this solution, when the foregoing incorrect logic indication appears, it may be understood that timing of the inactivity timer expires, and a system may tolerate the foregoing incorrect logic indication. In this way, a fault tolerance capability of the system can be improved, and normal running of the inactivity timer can be further ensured, thereby improving reliability and stability of the system.

In a possible design, the timed value indicated by the fourth indication information is greater than a current timed value of the inactivity timer. In other words, a timed value reconfigured by the network device for the inactivity timer in the terminal device is greater than the current timed value of the inactivity timer.

In this solution, a time of reaching the off state can be shortened as much as possible, so that the terminal device can enter the off state in advance as soon as possible, thereby reducing power consumption of the terminal device as much as possible. In a possible design, the second indication information and/or the fourth indication information are/is indicated in any one of the following manners: the second indication information and the fourth indication information are separately indicated by using different fields; or the second indication information is jointly indicated by using different fields; or the fourth indication information is jointly indicated by using different fields; or the second indication information and the fourth indication information are both indicated by using a value of one field; or the second indication information and the fourth indication information are separately indicated by using different bits in one field.

In this solution, a plurality of manners of indicating the second indication information and the fourth indication information are provided, to improve indication flexibility, and flexibly use a field and a bit in the first DCI based on an actual situation, thereby enhancing applicability of the solution. In a possible design, the first DCI may carry the first indication information, the second indication information, the third indication information, and the fourth indication information.

In this solution, a time length of reaching the off state can be shortened twofold by using the third indication information and the fourth indication information, so that the terminal device can enter the off state relatively quickly, to reduce power consumption of the terminal device as soon as possible. In a possible design, the first DCI is transmitted in an associated search space, and a configuration message for configuring the associated search space carries at least one of the second indication information, the third indication information, or the fourth indication information, where the third indication information is used to indicate the total timing value of the inactivity timer, and the fourth indication information is used to indicate the timed value of the inactivity timer.

In the foregoing solution, because the second indication information, the third indication information, or the fourth indication information is indication information used to indicate that the first DCI in this application is different from existing DCI. In other words, based on the existing DCI, the second indication information, the third indication information, and the fourth indication information may be used to explicitly indicate some information related to timing of the inactivity timer, and some new indication functions are added in comparison with the existing DCI. Therefore, when the first DCI is being interpreted, the first DCI needs to be interpreted in a new interpretation manner. To implement perception unification between the terminal and the network, the network device may notify, by using an RRC configuration message, the terminal device that the new interpretation manner in this embodiment of this application needs to be used to interpret subsequently received first DCI. It is simply understood that the network device may notify, by using the RRC configuration message, the terminal device that the first DCI is DCI that can indicate at least one of the operation mode of the inactivity timer, the total timing value of the inactivity timer, and the timed value of the inactivity timer. Further, the terminal device may implement perception unification with the network device based on the RRC configuration message, to ensure accurate information exchange between the terminal and the network. In a possible design, if the first DCI is transmitted in a USS, the first DCI carries at least one of the second indication information, the third indication information, or the fourth indication information; and if the first DCI is transmitted in a CSS, the first DCI does not carry the second indication information, the third indication information, or the fourth indication information.

In the foregoing solution, whether DCI has the foregoing new indication function may be directly indicated to the terminal device based on a type of a search space, so that signaling overheads of DCI that is transmitted in a CSS-type search space and that does not require the foregoing new function can be reduced. According to a second aspect, an information transmission method is provided. The method may be performed by a network device. In this method, the network device determines first DCI, and sends the first DCI to a terminal device. The first DCI carries first indication information and second indication information, the first indication information is used to indicate data transmission, and the second indication information is used to indicate an operation mode of an inactivity timer in DRX.

In this solution, the operation mode of the inactivity timer may be explicitly indicated by the second indication information carried in the first DCI. The terminal device may determine a specific operation mode of the inactivity timer after receiving the first DCI, unlike a current technology in which the inactivity timer is restarted to restart timing as long as DCI used to indicate data scheduling is received. In this way, an implicit indication function in the current technology that DCI used to indicate data transmission definitely corresponds to timing starting or timing resetting and then timing restarting of the inactivity timer can be decoupled, and scheduling flexibility can be improved by using different operation modes of the inactivity timer. For example, the network device may indicate, when an amount of remaining data that needs to be transmitted decreases, an operation mode of continuing timing by keeping a current timing value, or may indicate, when no data needs to be transmitted, an operation mode of stopping timing. In this way, scheduling flexibility and power consumption of the terminal device can be balanced as much as possible, and power consumption of the terminal device can be reduced as much as possible while ensuring timely and effective data transmission, so that power of the terminal device can be saved and a device battery life of the terminal device can be prolonged.

In a possible design, before sending the first DCI to the terminal device, the network device may further send DRX configuration information to the terminal device, so that the terminal device completes a DRX configuration based on the DRX configuration information and starts a DRX mode.

In a possible design, the second indication information is explicitly indicated in the first DCI, and the first DCI is used to schedule new data transmission or data retransmission.

In a possible design, an NDI field in the first DCI carries the first indication information, and a field in the first DCI other than the NDI field carries the second indication information.

In a possible design, when the first DCI is used to schedule new data transmission, the second indication information indicates that the operation mode of the inactivity timer is continuing timing, stopping timing, or starting timing; or when the first DCI is used to schedule data retransmission, the second indication information is used to indicate that the operation mode of the inactivity timer is resetting timing, stopping timing, or starting timing.

In a possible design, the second indication information is used for indication based on whether a value of a field in the first DCI is the same as a value of the field in a previous piece of DCI of the first DCI. If the values are the same, the second indication information indicates that the operation mode of the inactivity timer is stopping timing or continuing timing, and if the values are different, the second indication information indicates that the operation mode of the inactivity timer is starting timing or resetting timing; or if the values are the same, the second indication information indicates that the operation mode of the inactivity timer is starting timing or resetting timing, and if the values are different, the second indication information indicates that the operation mode of the inactivity timer is stopping timing or continuing timing.

In a possible design, for a plurality of pieces of continuously transmitted DCI including the first DCI, a quantity of times of consecutive and repeated sending having a same value as the field in the first DCI is greater than or equal to a predetermined threshold, and the predetermined threshold is an integer greater than or equal to 2.

In a possible design, the operation mode of the inactivity timer includes any one of the following: starting timing, stopping timing, resetting timing, and continuing timing.

In a possible design, a format of the first DCI is any one of format 0_0, format 0_1, format 1_0, and format 1_1. When the format of the first DCI is format 0_0, format 1_0, or format 1_1, a CRC bit of the first DCI is scrambled by a C-RNTI or a CS-RNTI; and when the format of the first DCI is format 0_1, the CRC bit of the first DCI is scrambled by a C-RNTI, a CS-RNTI, or an SP-CSI-RNTI.

In a possible design, the terminal device receives, in a DRX active time, the first DCI sent by the network device.

In a possible design, the terminal device receives, in a timing process of a HARQ round trip time timer, the first DCI sent by the network device.

In a possible design, the first DCI further carries third indication information, the third indication information is used to indicate a total timing value of the inactivity timer, and the total timing value indicated by the third indication information is one of a plurality of total timing values configured by the network device for the terminal device.

In a possible design, when the total timing value indicated by the third indication information is less than or equal to a timed value of the inactivity timer, it indicates that timing of the inactivity timer expires.

In a possible design, the total timing value indicated by the third indication information is less than a current total timing value of the inactivity timer. In other words, a total timing value reconfigured by the network device is less than the current total timing value of the inactivity timer.

In a possible design, the second indication information and/or the third indication information are/is indicated in any one of the following manners: the second indication information and the third indication information are separately indicated by using different fields; or the second indication information is jointly indicated by using different fields; or the third indication information is jointly indicated by using different fields; or the second indication information and the third indication information are both indicated by using a value of one field; or the second indication information and the third indication information are separately indicated by using different bits in one field.

In a possible design, the first DCI further carries fourth indication information, and the fourth indication information is used to indicate a timed value of the inactivity timer.

In a possible design, the timed value includes a quantity of time units or a timed proportion value, and the timed proportion value is used to indicate a proportion of the total timing value of the inactivity timer.

In a possible design, when the timed value indicated by the fourth indication information is greater than or equal to the total timing value of the inactivity timer, it indicates that timing of the inactivity timer expires.

In a possible design, the timed value indicated by the fourth indication information is greater than a current timed value of the inactivity timer. In other words, a timed value reconfigured by the network device for the inactivity timer in the terminal device is greater than the current timed value of the inactivity timer.

In a possible design, the second indication information and/or the fourth indication information are/is indicated in any one of the following manners: the second indication information and the fourth indication information are separately indicated by using different fields; or the second indication information is jointly indicated by using different fields; or the fourth indication information is jointly indicated by using different fields; or the second indication information and the fourth indication information are both indicated by using a value of one field; or the second indication information and the fourth indication information are separately indicated by using different bits in one field.

In a possible design, the first DCI may carry the first indication information, the second indication information, the third indication information, and the fourth indication information.

In a possible design, the first DCI is transmitted in an associated search space, and a configuration message for configuring the associated search space carries at least one of the second indication information, the third indication information, or the fourth indication information, where the third indication information is used to indicate the total timing value of the inactivity timer, and the fourth indication information is used to indicate the timed value of the inactivity timer.

In a possible design, if the first DCI is transmitted in a USS, the first DCI carries at least one of the second indication information, the third indication information, or the fourth indication information; and if the first DCI is transmitted in a CSS, the first DCI does not carry the second indication information, the third indication information, or the fourth indication information.

The possible design solutions in the second aspect and the possible design solutions in the first aspect are the same or corresponding solutions. Therefore, for beneficial technical effects of the possible design solutions in the second aspect, refer to the effect descriptions of the possible designs corresponding to the first aspect. According to a third aspect, a communications apparatus is provided. The communications apparatus may be a terminal device, or may be an apparatus in a terminal device. The apparatus may include a processing module and a receiving module. These modules may perform corresponding functions performed by the terminal device in any design example of the first aspect.

According to a fourth aspect, a communications apparatus is provided. The communications apparatus may be a network device, or may be an apparatus in a network device. The apparatus may include a processing module and a sending module. These modules may perform corresponding functions performed by the network device in any design example of the second aspect.

According to a fifth aspect, a communications apparatus is provided. The communications apparatus may be a terminal device. The communications apparatus includes a processor, configured to implement the method described in the first aspect. The communications apparatus may further include a memory, configured to store program instructions and data. The memory is coupled to the processor, and the processor may invoke and execute the program instructions stored in the memory, to implement the method described in the first aspect. The communications apparatus may further include a transceiver. The transceiver is used by the communications apparatus to communicate with another device. For example, the another device is a network device.

According to a sixth aspect, a communications apparatus is provided. The communications apparatus may be a network device. The communications apparatus includes a processor, configured to implement the method described in the second aspect. The communications apparatus may further include a memory, configured to store program instructions and data. The memory is coupled to the processor, and the processor may invoke and execute the program instructions stored in the memory, to implement the method described in the second aspect. The communications apparatus may further include a transceiver. The transceiver is used by the communications apparatus to communicate with another device. For example, the another device is a terminal device.

According to a seventh aspect, a computer-readable storage medium is provided. The computer-readable storage medium includes computer instructions. When the computer instructions are run on a computer, the computer is enabled to perform the method described in the first aspect.

According to an eighth aspect, a computer-readable storage medium is provided. The computer-readable storage medium includes computer instructions. When the computer instructions are run on a computer, the computer is enabled to perform the method described in the second aspect.

According to a ninth aspect, a chip system is provided. The chip system includes a processor, and may further include a memory, configured to implement the method described in the first aspect. The chip system may include a chip, or may include a chip and another discrete device.

According to a tenth aspect, a chip system is provided. The chip system includes a processor, and may further include a memory, configured to implement the method described in the second aspect. The chip system may include a chip, or may include a chip and another discrete device.

According to an eleventh aspect, a communications system is provided. The communications system includes the communications apparatus in the third aspect and the communications apparatus in the fourth aspect.

According to a twelfth aspect, a communications system is provided. The communications system includes the communications apparatus in the fifth aspect and the communications apparatus in the sixth aspect.

According to a thirteenth aspect, a computer program product including instructions is provided. The computer program product stores the instructions, and when the instructions are run on a computer, the computer is enabled to perform the method described in the first aspect.

According to a fourteenth aspect, a computer program product including instructions is provided. The computer program product stores the instructions, and when the instructions are run on a computer, the computer is enabled to perform the method described in the second aspect.

In the embodiments of this application, the operation mode of the inactivity timer is explicitly indicated by the second indication information carried in the first DCI. In this way, power consumption of the terminal device can be reduced as much as possible while ensuring timely and effective data transmission, so that power of the terminal device can be saved and a device battery life of the terminal device can be prolonged.

DESCRIPTION OF EMBODIMENTS

Figure 1:
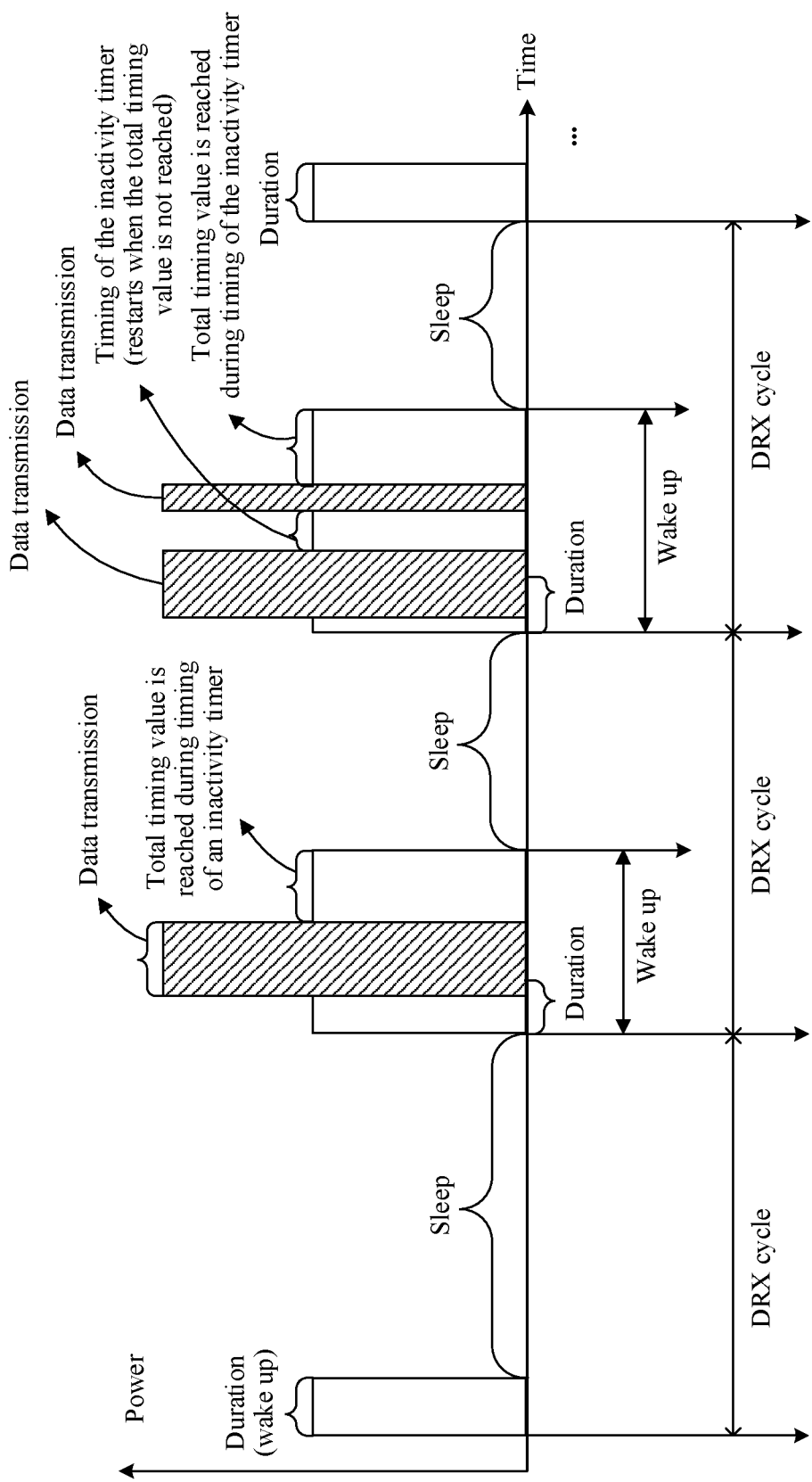
FIG. 1 is a schematic diagram of a C-DRX mechanism.

To make the objectives, technical solutions, and advantages of embodiments of this application clearer, the following clearly describes the technical solutions of the embodiments of this application with reference to the accompanying drawings in the embodiments of this application.

In the following, some terms of the embodiments of this application are described, so as to help a person skilled in the art have a better understanding.

1. A terminal device may be a device that provides a user with voice and/or data connectivity, for example, may be a handheld device with a wireless connection function, or a processing device connected to a wireless modem. The terminal device may communicate with a core network by using a radio access network (RAN), and exchange voice and/or data with the RAN. The terminal device may include user equipment (UE), a wireless terminal device, a mobile terminal device, a subscriber unit, a subscriber station, a mobile station, a mobile, a remote station, an access point (AP), a remote terminal device, an access terminal device, a user terminal device, a user agent, a user device, and the like. For example, the terminal device may include a mobile phone (or referred to as a "cellular" phone), a computer with a mobile terminal device, a portable, pocket-sized, handheld, computer built-in, or in-vehicle mobile apparatus, or an intelligent wearable device (for example, a smartwatch, smart glasses, or a smart helmet). For example, the terminal device may be a device such as a personal communication service (PCS) phone, a cordless phone, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

The terminal device may be alternatively a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, or the like.

2. A network device includes, for example, an access network (access network, AN) device and a core network device. The access network device is, for example, a base station (for example, an access point), and may be a device that communicates with a wireless terminal device via one or more cells at an air interface in an access network. The network device may be configured to mutually convert a received over-the-air frame and an internet protocol (IP) packet and serve as a router between the terminal device and a rest part of the access network, where the rest portion of the access network may include an IP network. The network device may coordinate attribute management of the air interface. For example, the network device may include an evolved NodeB (NodeB, eNB, or e-NodeB, evolutional Node B) in a long term evolution (LTE) system or an LTE-advanced system (LTE-A), or may include a next generation NodeB (gNB) in a fifth generation (5G) new radio (NR) system. This is not limited in the embodiments of this application. In the LTE system, the core network device is, for example, a mobility management entity (MME). In the NR system, the core network device is, for example, an access and mobility management function (AMF). In a network structure, the network device may include a centralized unit (CU) node, a distributed unit (DU) node, or include a CU node and a DU node. This is not limited in the embodiments of this application.

3. DRX: In a DRX mechanism, the terminal device stops monitoring a PDCCH in a sleep time. There are two types of DRX: idle DRX (IDLE-mode DRX) and connected DRX (Connected-mode DRX, C-DRX). The idle DRX is also referred to as DRX in an idle state, and the C-DRX is also referred to as DRX in a connected state.

The IDLE-mode DRX is discontinuous reception when the terminal device is in an idle state. Because there is no radio resource control (RRC) connection or a dedicated resource of the terminal device when the terminal device is in an idle state, the terminal device mainly monitors a paging message in the IDLE-mode DRX, to implement discontinuous reception as long as a period of the paging message is defined. When monitoring user data, the terminal device needs to leave the idle state, for example, first enters a connected state from the idle state.

The C-DRX is DRX when the terminal device is in an RRC connected state. In the C-DRX, the terminal device periodically performs blind detection on a PDCCH. If no PDCCH is detected in a period of time, the terminal device enters a sleep state, and stops detecting the PDCCH in the sleep state, to reduce energy consumption of detecting the PDCCH by the terminal device, thereby saving power. A state in which the terminal device detects the PDCCH may be referred to as a wake up state, on duration, an active mode, or a wake up mode, and the sleep state may be referred to as an off mode or a sleep mode. Simply understood, the terminal device may detect the PDCCH in the wake up state, and stop detecting the PDCCH in the sleep state.

In the following descriptions, the technical solutions in the embodiments of this application are described by using a C-DRX mode.

4. A downlink control channel is, for example, a physical downlink control channel (PDCCH), or an enhanced physical downlink control channel (enhanced physical downlink control channel, EPDCCH), or a narrowband physical downlink control channel (NPDCCH), or may be another downlink control channel.

5. A time unit is a unit of time, for example, a unit of time including one slot, one subframe, one mini-slot, or one orthogonal frequency division multiplexing (OFDM) symbol, one millisecond (ms), or one fractional millisecond (for example, 1/32 ms), or a unit of time including a plurality of slots, a plurality of subframes, a plurality of mini-slots, a plurality of OFDM symbols, several milliseconds (ms), or several fractional milliseconds.

6. The terms "system" and "network" may be used interchangeably in the embodiments of this application. "A plurality of" means two or more, and therefore "a plurality of" may also be understood as "at least two" in the embodiments of this application. "At least one" may be understood as one or more, for example, one, two, or more. For example, including at least one means including one, two, or more, and which ones are included is not limited. For example, including at least one of A, B and C may be including A, B, C, A and B, A and C, B and C, or A, B, and C. "At least two" may be understood as two or more. Similarly, descriptions of "at least one" or the like are also understood in a similar way. The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

In addition, unless otherwise stated, ordinal numbers such as "first" and "second" mentioned in the embodiments of this application are intended to distinguish between a plurality of objects, and not intended to limit an order, a time sequence, priorities, or importance of the plurality of objects.

To better understand the technical solutions provided in the embodiments of this application, the following first describes the technical background of the embodiments of this application.

As described above, power consumption of a terminal device may be reduced by using a DRX mechanism, to save power and prolong a device battery life. In the DRX mechanism, the terminal device continuously detects a PDCCH in a period of time after wake-up, and relatively high power consumption still exists in the continuous detection process. For ease of understanding, the following describes a current technology with reference to a schematic diagram of a C-DRX mechanism shown in FIG. 1.

Referring to FIG. 1, DRX has a DRX cycle, and one DRX cycle includes two states: a wake up state and a sleep state. Corresponding duration is configured for each state. In FIG. 1, the wake up state is represented as active, and the sleep state is represented as off. A total time length of active includes duration of on duration and a timing length of an inactivity timer. In an active state, the terminal device continuously detects a PDCCH. If the terminal device fails to detect the PDCCH when the duration configured for on duration ends, the terminal device enters an off state. In the off state, the terminal device stops detecting the PDCCH, to reduce power consumption. If the PDCCH is detected within the duration configured for on duration, it indicates that data needs to be transmitted. In this case, the inactivity timer is started for timing to ensure timely data transmission. The terminal device continuously maintains the active state during timing of the inactivity timer. In this way, impact on timely data transmission due to premature entering of the off state can be avoided. In other words, duration of the active state is prolonged through timing of the inactivity timer, so that complete and timely data transmission can be ensured when data needs to be transmitted. It may be conceived that, when on duration is about to end, if it is determined that data transmission needs to be performed but there is no inactivity timer mechanism to prolong the active state, a power saving mode of the off state is entered when originally remaining duration of the active state may be not enough to complete transmission of data that needs to be transmitted. In this case, data can be continuously transmitted only when a next DRX cycle arrives. Clearly, this affects timely data transmission and causes a delay.

The inactivity timer may also be represented as a drx-inactivity timer, for example, may be referred to as an inactivity timer, an inactive timer, or another name. The inactivity timer indicates that after detecting a PDCCH indicating data transmission, the terminal device further needs to continue to detect a time length of the PDCCH. The time length may be represented by a time unit, for example, may be represented by ms, a PDCCH subframe, or another time unit. For example, when the time length is 80 ms, it indicates that timing expires when the inactivity timer counts up to 80 ms.

In addition, a corresponding timer, namely, an on duration timer, is also configured during on duration and the on duration timer may also be represented as a drx-on duration timer, for example, may be referred to as a duration timer, or another name. The on duration timer indicates a time length in which the terminal device is in a wake up state after entering a DRX cycle. Similarly, the time length may be represented by ms, a PDCCH subframe, or another time unit. In a possible implementation, time units configured for the on duration timer and the inactivity timer to indicate timing lengths of the timers may be the same, for example, a time unit of ms is used.

As described in the foregoing descriptions of the inactivity timer, it may be learned that in some cases, duration of the active state may be prolonged due to existence of the inactivity timer. Taking FIG. 1 as an example, a first DRX cycle is compared with a second DRX cycle, duration of the active state is equal to duration of on duration in the first DRX cycle, that is, no PDCCH is detected during on duration in the first DRX cycle, and duration of the active state in the second DRX cycle is greater than the duration of the active state in the first DRX cycle. For ease of description, for example, the duration of on duration may be referred to as an on duration time length, and the duration of the active state may be referred to as an active time length. The on duration time length in the first DRX cycle is initially configured, and may be specifically indicated by timing of the on duration timer. The on duration time length is, for example, 10 ms. In the second DRX cycle, when timing of the on duration timer is about to expire, for example, a PDCCH used to indicate data transmission is detected in the $8^{th}$ ms of timing, it indicates that data needs to be transmitted. In this case, the inactivity timer is started to ensure timely data transmission. It is assumed that the inactivity timer is 80 ms. Therefore, the PDCCH is continuously detected within 80 ms from the $8^{th}$ ms of on duration. If no PDCCH is detected within 80 ms, the terminal device enters the off state. It may be learned that, due to participation of the inactivity timer, active duration (the on duration time length) that originally has only 8 ms is increased to 88 ms, or in other words, the active time length is prolonged. In this manner, timely data transmission can be ensured to minimize a service delay. However, a time of entering the off state is delayed, or in other words, duration of the off state is shortened, and power consumption of the terminal device is also increased.

In addition, after the PDCCH is detected for the first time and the inactivity timer is started during on duration, if the PDCCH is detected again, the terminal device restarts the inactivity timer to perform a new round of timing. Continuing the foregoing example, the inactivity timer starts timing from 0 each time the PDCCH is detected. If the inactivity timer has not performed timing before, the inactivity timer is started to start timing from 0. If the inactivity timer has performed timing before, the inactivity timer is restarted to start timing from 0. The restarting herein means that a previous timed value is cleared. The inactivity timer starts timing from 0 each time one PDCCH is detected, and the off state is entered only after timing of the restarted inactivity timer expires. If a quantity of PDCCHs is relatively large, the active time length may be excessively prolonged, and a time length of the off state is excessively shortened. Therefore, it is difficult to ensure an objective of reducing power consumption. An inactivity timer value of the inactivity timer is semi-statically configured by using radio resource control (RRC) signaling. However, in an existing configuration manner, once the inactivity timer is started for timing, the inactivity timer can enter the off state only after timing of the inactivity timer expires. If an excessively large value is configured, duration of the active state is excessively prolonged, and power consumption is excessively high. If an excessively small value is configured, it may be difficult to meet effective and timely data transmission, thereby affecting data scheduling flexibility. Therefore, in the inactivity timer mechanism in the current technology, it is difficult to balance scheduling flexibility and power consumption of the terminal device. For a case in which an excessively large inactivity timer value is configured, currently, timing may be terminated by using a medium access control control element (MAC CE) during timing of the inactivity timer. However, there may be a delay of a dozen of slots (in some cases, for example, more than 10 ms) from a moment at which a network device (for example, a base station) determines to send the MAC CE to a moment at which the terminal device receives the MAC CE and the MAC CE takes effect. For implementation of the base station, because service data of the network device is not perceived and predicted, to perform timely processing when the service data arrives, the base station usually does not terminate timing of the inactivity timer in advance by using the MAC CE.

In view of the above, in the current technology, in the inactivity timer mechanism for semi-statically configuring the inactivity timer value, scheduling flexibility and power consumption of the terminal device are not balanced, and a requirement on adaptive data transmission is difficult to adapt. Therefore, in a process of detecting a PDCCH, there is a technical problem of relatively high device power consumption. In view of this, the embodiments of this application provide an information transmission method. In the technical solutions of the embodiments of this application, when sending, to a terminal device, first downlink control information (DCI) used to indicate data transmission, a network device may include, in the first DCI, second indication information used to indicate an operation mode of an inactivity timer, and the second indication information explicitly indicates the operation mode of the inactivity timer. After receiving the first DCI, the terminal device may determine the operation mode of the inactivity timer, for example, starting timing, stopping timing, resetting timing, continuing timing by keeping a current timing value, or another operation mode, unlike the current technology in which the inactivity timer is restarted to restart timing as long as DCI used to indicate data scheduling is received. In the solution of explicitly indicating the operation mode of the inactivity timer in the DCI used to indicate data transmission, an implicit indication function in the current technology that the DCI used to indicate data transmission definitely corresponds to restarting of the inactivity timer to restart timing can be decoupled. For example, an implicit indication function in the current technology that the inactivity timer definitely starts timing or resets timing when a new data indicator (NDI) indicates new data transmission can be decoupled. In other words, in the embodiments of this application, the explicit indication of the operation mode of the inactivity timer by using the second indication information may overwrite a function of implicitly indicating, by the NDI, to start or not start the inactivity timer. In addition, scheduling flexibility can be improved by using different operation modes of the inactivity timer. For example, the network device may indicate, when an amount of remaining data that needs to be transmitted decreases, an operation mode of continuing timing by keeping a current timing value, or may indicate, when no data needs to continue to be transmitted, an operation mode of stopping timing. In this way, scheduling flexibility and power consumption of the terminal device can be balanced as much as possible, and power consumption of the terminal device can be reduced as much as possible while ensuring timely and effective data transmission. The technical solutions provided in the embodiments of this application may be applied to a 5G system, an LTE system, or a next-generation mobile communications system or another similar communications system. This is not specifically limited.

The foregoing describes the technical background of the embodiments of this application, and the following further describes an application scenario of the embodiments of this application.

Figure 2:
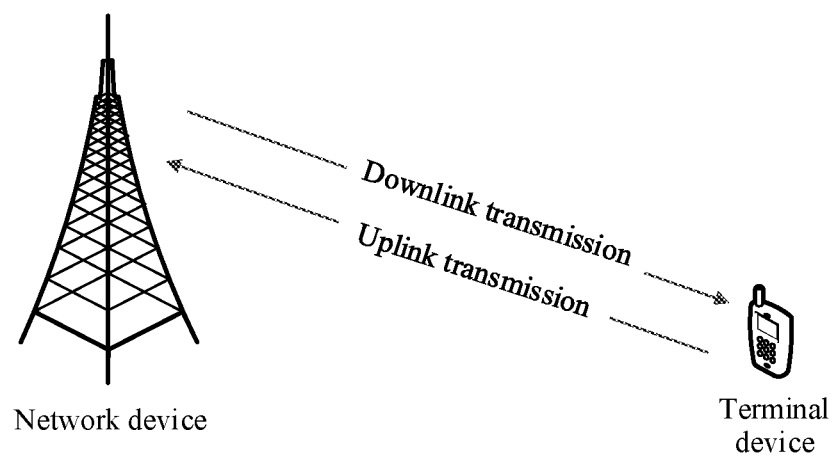
FIG. 2 is a schematic diagram of an application scenario according to an embodiment of this application.

FIG. 2 is a schematic diagram of a possible application scenario according to an embodiment of this application. The application scenario includes a network device and a terminal device. Functions of the network device and the terminal device have been described above, and details are not described herein again. The terminal device is wirelessly connected to the network device, and data may be transmitted between the terminal device and the network device. For example, data sent by the network device to the terminal device is referred to as downlink transmission, and data sent by the terminal device to the network device is referred to as uplink transmission. The application scenario shown in FIG. 2 may be an application scenario in an NR system, an application scenario in an LTE system, or the like. For example, if the application scenario shown in FIG. 2 is the application scenario in the NR system, the network device may be a gNB in the NR system, and the terminal device may be a terminal device in the NR system.

It should be noted that the scenario shown in FIG. 2 shall not constitute a limitation on the application scenario of the embodiments of this application. In actual application, a plurality of network devices and a plurality of terminal devices may be included. For example, one terminal device may transmit data to only one network device or a plurality of network devices, or one network device may transmit data to one terminal device or a plurality of terminal devices. In other words, a quantity of terminal devices and a quantity of network devices in FIG. 2 are merely an example. In actual application, one network device may serve a plurality of terminal devices. This is not specifically limited in this embodiment of this application.

The following describes the technical solutions provided in the embodiments of this application with reference to the accompanying drawings.

Figure 3:
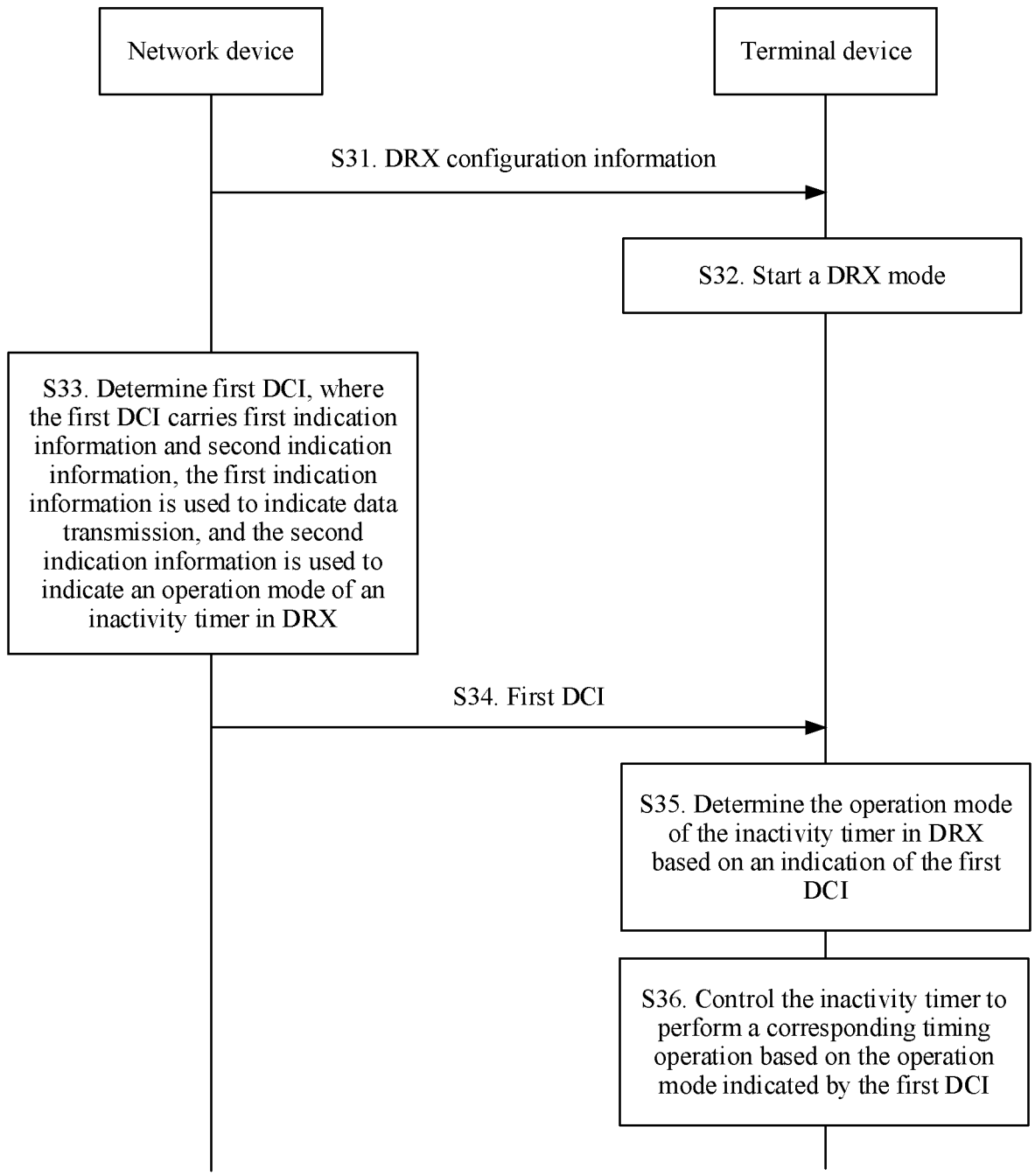
FIG. 3 is a flowchart of an information transmission method according to an embodiment of this application.

FIG. 3 is a flowchart of an information transmission method according to an embodiment of this application. In the following description process, for example, the method is applied to the scenario shown in FIG. 2. A procedure of the method is described as follows:

S31. A network device sends DRX configuration information to a terminal device, and the terminal device may receive the DRX configuration information sent by the network device.

In a radio resource configuration process, the network device may send a DRX configuration message to the terminal device. The DRX configuration information may include initial values of various timers in a DRX mode configured for the terminal device, and the timers in the DRX mode may include at least one of a drx-on duration timer, a drx-inactivity timer, a drx-HARQ RTT timerDL, a drx-HARQ RTT timerUL, a drx-retransmission timerDL, a drx-retransmission timerUL, a drx-long cycle timer, and a drx-short cycle timer. Certainly, the DRX configuration message may further include other content. This is not enumerated herein.

Figure 4A:
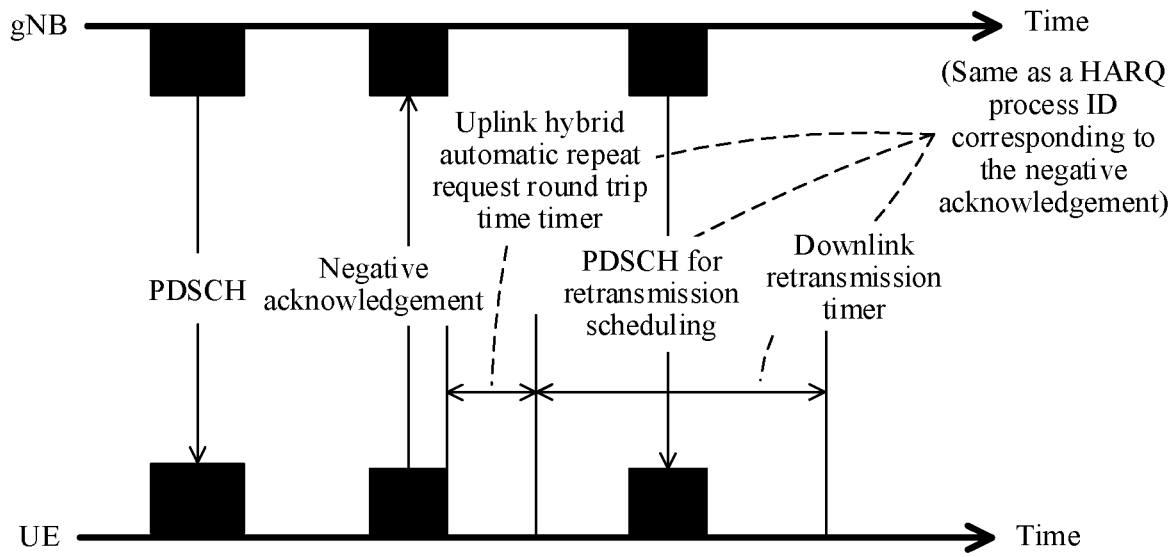
FIG. 4a is a schematic timing diagram of a downlink HARQ round trip time timer HARQ-RTT-TimerDL and a downlink retransmission timer RetransmissionTimerDL according to an embodiment of this application.

The drx-on duration timer and the drx-inactivity timer have been described above, and details are not described herein again. Other timers are not primarily covered in the embodiments of this application, and therefore are merely briefly described herein. The drx-long cycle timer and the drx-short cycle timer refer to life cycles of a long DRX cycle and a short DRX cycle in a DRX mechanism. The drx-HARQ RTT timerUL may be referred to as an uplink hybrid automatic repeat request round trip time timer, and a timing length of the drx-HARQ RTT timerUL indicates a to-be-waited time length before uplink retransmission scheduling. The drx-HARQ RTT timerDL may be referred to as a downlink hybrid automatic repeat request round trip time timer, and a timing length of the drx-HARQ RTT timerDL indicates a to-be-waited time length before downlink retransmission scheduling. The drx-retransmission timerUL may be referred to as an uplink retransmission timer, and a timing length of the drx-retransmission timerUL indicates a time length in which the network device detects a downlink control channel before uplink data is retransmitted. The drx-retransmission timerDL may be referred to as a downlink retransmission timer, and a timing length of the drx-retransmission timerDL indicates a time length in which the terminal device detects a downlink control channel before downlink data is retransmitted and received. FIG. 4a shows a relationship between the drx-HARQ RTT timerDL and the drx-retransmission timerDL. It may be learned that the drx-HARQ RTT timerDL starts timing after the terminal device sends the last symbol of a HARQ-ACK, and after the drx-HARQ RTT timerDL ends the timing, if the terminal device sends a negative acknowledgement NACK, the drx-retransmission timerDL starts timing. The drx-HARQ RTT timerDL, the drx-retransmission timerDL, the NACK, and a physical downlink shared channel (physical downlink shared channel, PDSCH) for retransmission scheduling in the figure all correspond to a same downlink HARQ process.

S32. The terminal device starts a DRX mode based on the received DRX configuration information.

After receiving the DRX configuration message sent by the network device, the terminal device may start the DRX mode, and then periodically wake up and sleep based on a configured DRX cycle, to reduce energy consumption. Specifically, if the terminal device determines, by using the DRX configuration information sent by the network device, that the network device configures a long DRX cycle and a short DRX cycle for the terminal device, or the network device configures only a long DRX cycle for the terminal device, the terminal device may enter the long DRX cycle; or if the terminal device determines that the network device configures only a short DRX cycle for the terminal device, the terminal device may enter the short DRX cycle. This is not limited herein. After entering the long DRX cycle or the short DRX cycle, the terminal device enters a sleep state or a wake up state based on a DRX configuration, detects a PDCCH in the wake up state to ensure correct data transmission, and stops detection of the PDCCH in the sleep state to reduce power consumption and save power.

S33. The network device determines first DCI, where the first DCI carries first indication information and second indication information, the first indication information is used to indicate data transmission, and the second indication information is used to indicate an operation mode of an inactivity timer in DRX.

It should be noted that the first DCI in this embodiment of this application may be a general reference of one type of DCI, and is not limited to a specified piece of DCI. This type of DCI may carry the first indication information and the second indication information. In other words, DCI having a same characteristic as the first DCI may be understood as the first DCI in this embodiment of this application, and the same characteristic herein may be understood as carrying the first indication information and the second indication information.

The first indication information in this embodiment of this application is used to indicate data transmission. The data transmission herein includes uplink data transmission or downlink data transmission, and may further include new data transmission or data retransmission. The new data transmission may also be referred to as initial data transmission. In other words, the first indication information is used to indicate that data transmission may be new transmission or retransmission of uplink data, or may be new transmission or retransmission of downlink data. For example, the first indication information is carried by using an NDI field in the first DCI. When a value of the NDI field in the first DCI is different from a value of the NDI in a previous piece of DCI of the first DCI, that is, when the NDI is inverted, the first indication information indicates new data transmission; or if the NDI is not inverted, the first indication information indicates data retransmission. In other words, the first DCI is DCI used to indicate new data transmission or data retransmission, and the first DCI is used to schedule new data transmission or data retransmission. In some other understanding manners, for example, "the first indication information is used to indicate data transmission" may be further understood as that the first indication information is used to indicate a transmission resource required for data transmission, or may be further understood as that the first indication information is used to indicate to perform data transmission on a scheduled transmission resource. In other words, the network device may indicate, by using the first indication information in the first DCI, that data transmission needs to be performed, and indicates a data transmission resource that can be used when data that needs to be transmitted is being transmitted. It may be learned that the first indication information may indicate that the first DCI is DCI used to indicate data transmission.

In this embodiment of this application, a format of the first DCI may be, for example, DCI in format 0_0 (format 0_0), format 0_1 (format 0_1), format 1_0 (format 1_0), format 1_1 (format 1_1), or DCI in another possible format. In other words, the format of the first DCI may be any one of format 0_0, format 0_1, format 1_0, and format 1_1. When the format of the first DCI is format 0_0, format 1_0, or format 1_1, a cyclic redundancy check (cyclic redundancy check, CRC) bit of the first DCI is scrambled by a cell radio network temporary identifier (cell radio network temporary identifier, C-RNTI) or a configured scheduling radio network temporary identifier (configured scheduling RNTI, CS-RNTI). When the format of the first DCI is format 0_1, the CRC bit of the first DCI is scrambled by a C-RNTI, a CS-RNTI, or a semi-persistent channel state information-radio network temporary identifier (semi-persistent channel state information RNTI, SP-CSI-RNTI). Because DCI in the foregoing format is used to indicate uplink or downlink data scheduling, the DCI is suitable to explicitly indicate, by using second information, whether to start or restart the inactivity timer for timing during the uplink or downlink data scheduling. In addition, only the foregoing DCI format corresponding to the foregoing scrambling RNTI is used to send the second indication information because these corresponding RNTIs are under control of a PDCCH detection regulation of DRX but the foregoing DCI formats scrambled by other RNTIs are not restricted by the PDCCH detection regulation of DRX, and therefore no additional field overhead is required. Therefore, DCI overheads can be reduced as much as possible by configuring the foregoing listed scrambling manner.

The second indication information in this embodiment of this application is used to indicate the operation mode of the inactivity timer in DRX, and the inactivity timer in DRX is the drx-inactivity timer described above. For ease of description, an inactivity timer is directly used to represent the inactivity timer in DRX and the drx-inactivity timer below for related descriptions.

The operation mode of the inactivity timer may be understood as a timing operation mode of the inactivity timer, a working mode of the inactivity timer, a timing mode of the inactivity timer, or the like. Regardless of the understanding manner, different operation modes of the inactivity timer may correspond to different timing operations of the timer. For ease of understanding, the following describes the operation mode of the inactivity timer with reference to FIG. 4.

Figure 4:
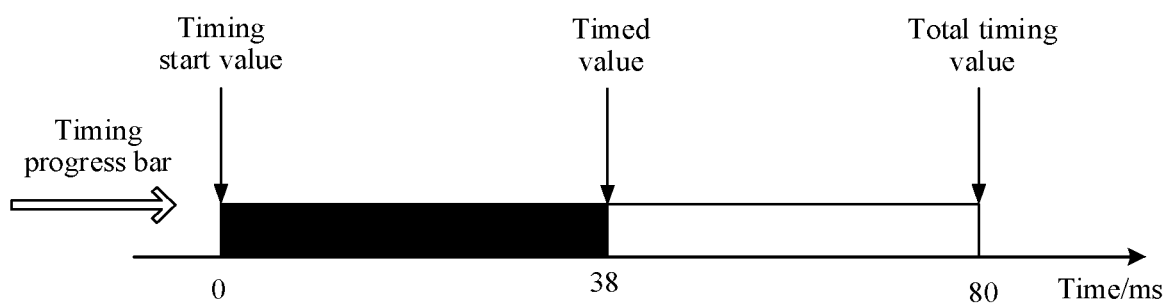
FIG. 4 is a schematic timing diagram of an inactivity timer according to an embodiment of this application.

Referring to a schematic diagram of a timing progress bar of the inactivity timer shown in FIG. 4, a total length of a blank rectangular frame indicates a total timing value of the inactivity timer. It is assumed that timing starts from a left side (a position indicated by 0) of the blank rectangular frame, a timing value corresponds to timing starting is referred to as a timing start value, and a total length of a black rectangular frame indicates a timed value.

Figure 5:
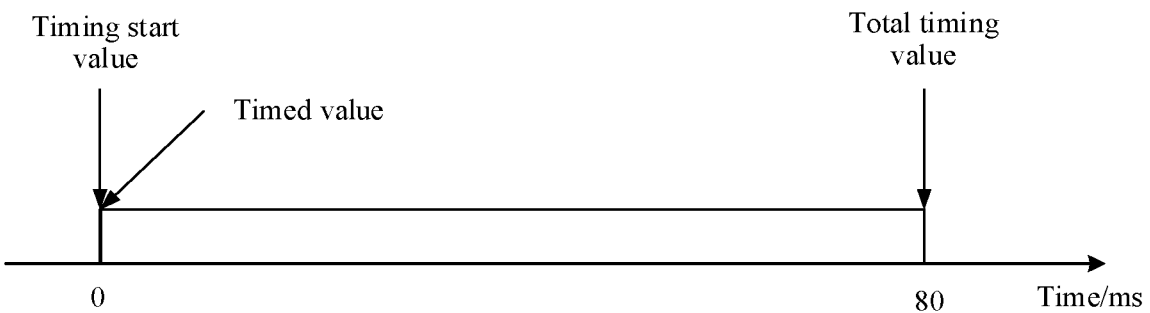
FIG. 5 is another schematic timing diagram of an inactivity timer according to an embodiment of this application.

The total timing value of the inactivity timer is also referred to as an inactivity timer value or a timing length of the inactivity timer, a time length of the inactivity timer, or a value of the inactivity timer, and the total timing value of the inactivity timer represents a maximum timing value of the inactivity timer. If the total timing value is reached during timing, timing of inactivity timer expires. The timed value of the inactivity timer indicates a current timed value. Generally, the timed value of the inactivity timer is less than or equal to the total timing value of the inactivity timer. The timing progress bar dynamically changes during timing of the inactivity timer. For example, the timing progress bar gradually increases in a direction from the timing start value to the total timing value shown in FIG. 4. Correspondingly, the timed value gradually increases as the timing progress bar increases. In other words, the timed value may be represented by a change in the timing progress bar. As shown in FIG. 4, it is assumed that the total timing value of the inactivity timer is 80 ms, or in other words, the inactivity timer expires after 80 ms is reached during timing, and the current timed value of the inactivity timer is 38 ms. Alternatively, for another example, as shown in FIG. 5, if the total timing value of the inactivity timer is still 80 ms but the current timed value is 0, it indicates that the inactivity timer does not start timing currently or is about to start timing.

In this embodiment of this application, the inactivity timer may include four operation modes: starting timing, stopping (stop) timing, resetting timing, and continuing timing. In other words, the operation mode of the inactivity timer may include any one of starting timing, resetting timing, continuing timing, and stopping timing. The following describes several operation modes of the inactivity timer in detail.

The operation mode of starting timing means that the inactivity timer is started to start timing. The inactivity timer is not in a timing state before performing a starting operation. For example, when the inactivity timer is not started, the inactivity timer may be started by using the operation mode of starting timing, to trigger the inactivity timer to perform timing. Taking FIG. 5 as an example, because the inactivity timer in FIG. 5 does not start timing currently, after performing a timing starting operation, the inactivity timer may start timing from the timing start value, or in other words, start timing from 0. By using the operation mode of starting timing, the inactivity timer may be started in a timely manner to perform timing, thereby prolonging duration of an active state of the terminal device as much as possible, to ensure complete data transmission. For example, at a moment close to an end moment of on duration, starting of the inactivity timer may be further indicated by using DCI used to indicate data transmission. In this way, duration of the active state can be prolonged, so that the terminal device can complete data transmission in a timely manner in the prolonged active state, thereby reducing a data delay.

The operation mode of stopping timing means that the inactivity timer that is performing timing stops timing, and the inactivity timer no longer performs timing after stopping timing. For example, as shown in FIG. 4, the inactivity timer is currently performing timing and the current timed value is 38 ms. If timing stops at this moment, it may be understood that timing of the inactivity timer is terminated. After timing is terminated, it directly indicates that timing of the inactivity timer expires. Still taking FIG. 4 as an example, if a timing stopping operation is performed when the current timed value is 38 ms, after timing stops, it may be considered that the timed value of the inactivity timer is directly adjusted from 38 ms to 80 ms, or in other words, timing expires. When timing expires, the inactivity timer definitely no longer performs timing, or in other words, timing of the inactivity timer ends, so that a sleep mode can be entered in advance as soon as possible. Alternatively, in another understanding manner, after timing stops, the inactivity timer retains the current timed value and no longer performs timing until another indication is received. When no data needs to be transmitted or only a very small amount of data needs to be transmitted, the network device may advance, by using the operation mode indicating to stop, a time at which the terminal device enters an off state, to reduce device power consumption as much as possible and save power.

The operation mode of resetting timing means that the current timed value is cleared and timing restarts from the timing start value. Still taking FIG. 4 as an example, if a timing resetting operation is performed when the current timed value is 38 ms, the timed value 38 ms needs to be cleared first, the timed value of the inactivity timer after the clearing is reset to the timing start value, namely, 0, and then timing restarts from 0. Timing restarts after the resetting, so that duration of an active state is prolonged to some extent. For example, when the network device still needs to transmit a relatively large amount of data, to ensure that the data can be transmitted as much as possible in a current DRX cycle, a start time of an off state is deferred as much as possible in a timing resetting manner, to ensure complete and timely data transmission.

The operation mode of continuing timing means that timing continues on a basis of the current timed value. Still taking FIG. 4 as an example, if a timing continuing operation is performed when the current timed value is 38 ms, the inactivity timer may continue timing after the timing continuing operation is performed, and therefore a next timed value is 39 ms.

In other words, the network device may properly and dynamically control the operation mode of the inactivity timer in the terminal device based on an amount of data that needs to be actually transmitted. In this way, data scheduling flexibility and power consumption of the terminal device can be properly balanced as much as possible, to adapt to a data transmission characteristic.

In a possible implementation, the network device may estimate an average size of a packet that can be scheduled for transmission per time unit for uplink or downlink transmission of the terminal device, for example, $\overline{B}$ bits, and then consider that an amount of data that can be scheduled within a remaining active time of the terminal device is $\overline{B}\times$ remaining active time, where the amount of data that can be scheduled may represent a capability of continuing transmitting data within the remaining time. The network device considers comparing the estimated amount of data that can be scheduled within the remaining active time with an amount of data in a buffer. For a downlink, the amount of data in the buffer is known to the network device. For an uplink, the amount of data in the buffer may be reported by the terminal device to the network device by using a medium access control (MAC) control element (CE) in a buffer status report (BSR).

If $\overline{B}\times$remaining active time≥amount of data in the buffer, when the first DCI indicates to schedule new data transmission, the first DCI may further explicitly indicate that the operation mode of the inactivity timer in the terminal device is continuing timing, or indicate the terminal device to use a total timing value less than the remaining active time.

If $\overline{B}\times$remaining active time≤amount of data in the buffer, when the first DCI indicates to schedule new data transmission, the first DCI may further explicitly indicate that the operation mode of the inactivity timer in the terminal device is starting timing or resetting timing.

In addition, the network device may further predict an amount of new arriving data in a downlink buffer or an uplink buffer in a future period of time, and compare $\overline{B}\times$remaining active time with (amount of data in the buffer+ predicted amount of new arriving data), to indicate the operation mode of the inactivity timer in the terminal device or indicate the total timing value.

In other words, based on factors such as a congestion status and a load status of current network congestion, the network device may dynamically indicate the operation mode of the inactivity timer in the terminal device and other parameters (for example, the total timing value and the timed value) related to the inactivity timer, so that scheduling flexibility and power consumption of the terminal device can be balanced as much as possible, and power consumption of the terminal device can be further reduced as much as possible while ensuring timely and effective data transmission.

In the foregoing four operation modes described by using examples, for the three operation modes: starting timing, resetting timing, and continuing timing, after performing corresponding operations, the inactivity timer continues performing timing until timing expires, and after performing a timing stopping operation, the inactivity timer ends timing, or in other words, no longer performs timing. In view of this, the operation modes of the inactivity timer may be roughly classified into two types: triggering timing ending and triggering timing. It may be understood that the foregoing listed four operation modes are merely example descriptions of the operation modes of the inactivity timer. In a specific implementation process, based on guidance of the foregoing two operation modes of triggering timing ending and triggering timing, other operation modes may be further provided. This is not enumerated herein.

In addition, in a specific implementation process, the first indication information and the second indication information may be indicated by using different fields in the first DCI. For example, the first indication information is indicated by using an NDI field in the first DCI, and the second indication information may be indicated by using another field different from the NDI. The another field herein is, for example, any other field different from the NDI field in an existing DCI format or a field formed based on a joint indication of available bits in a plurality of other fields, or the another field may be a field newly added based on an existing DCI format. Fields for carrying the first indication information and the second indication information are not limited in this embodiment of this application.

For an implementation in which the another field is a field newly added based on the existing DCI format, for example, one bit may be newly added, when a value of the newly added one bit is 1, for example, starting timing or continuing timing may be indicated; or when a value of the newly added one bit is 0, for example, resetting timing may be indicated. For the case in which the value is 1, if the value of the newly added one bit in the first DCI is 1, the terminal device may determine a corresponding timing manner based on a current timing status of the inactivity timer. For example, if the inactivity timer does not perform timing currently (for example, the inactivity timer is not started), a timing starting operation may be performed, or if the inactivity timer is performing timing currently, a timing continuing operation may be performed.

For an implementation in which the another field is a field newly added based on the existing DCI format, for example, two bits may be newly added, different values of the newly added two bits each may be used to correspondingly indicate one operation mode. For example, 00 is used to indicate to stop timing, 01 is used to indicate to start timing or reset timing and a timing length is a first time length, 10 is used to indicate to start timing or reset timing and a timing length is a second time length, and 11 is used to indicate to continue timing, or an indication manner in which other different values indicate different operation modes may be further used. Other examples are not provided herein.

In another implementation, the operation mode of the inactivity timer may be jointly indicated by using one newly added bit and one bit in another existing field. In the joint indication manner, each of four different values 00, 01, 10, and 11 formed by the newly added one bit and the existing one bit is used to correspondingly indicate one operation mode. A specific field to which one selected bit in the existing field belongs is not limited, as long as it is ensured that the selected existing one bit does not affect, as far as possible, an indication of information originally indicated by the field in which the existing one bit is located.

In this embodiment of this application, in the first DCI, the operation mode of the inactivity timer may be indicated based on whether a field used to carry the second indication information is inverted. The inversion herein is whether a value of the field changes in comparison with a value of the field in a previous piece of DCI of the first DCI, for example, whether 0 changes to 1 or whether 1 changes to 0. For example, one field is newly added based on an existing DCI format, and the operation mode of the inactivity timer is indicated based on whether a value of the newly added field is the same as a value of the field in the previous piece of DCI of the first DCI.

In a possible implementation, if the value of the newly added field is the same as the value of the field in the previous piece of DCI of the first DCI, the operation mode that is of the inactivity timer and that is indicated by the second indication information may be continuing timing; or if the two values are different, the indicated operation mode of the inactivity timer may be starting timing or resetting timing.

In another possible implementation, if the value of the newly added field is the same as the value of the field in the previous piece of DCI of the first DCI, the operation mode that is of the inactivity timer and that is indicated by the second indication information may be starting timing or resetting timing; or if the two values are different, the indicated operation mode of the inactivity timer may be continuing timing.

As described above, different operation modes may be indicated based on an inversion status of the newly added field. The foregoing describes some indications by using examples. In a specific implementation process, other operation modes different from the foregoing example may be indicated during inversion, and other operation modes different from the foregoing example may also be indicated when no inversion occurs.

Further, for the foregoing described solution in which the operation mode of the inactivity timer is indicated based on whether the field for carrying the second indication information is inverted, an inversion interval may be set. The inversion interval herein refers to a quantity of pieces of DCI of which at intervals the value of the field used to carry the second indication information is inverted, or a quantity of times that a same value of the field is repeatedly transmitted in a plurality of pieces of consecutively transmitted DCI. For example, for a plurality of pieces of consecutively transmitted DCI including the first DCI, values of fields that are in the plurality of pieces of DCI and that are used to carry the second indication information are successively 111000111000 in a transmission time sequence, and each value represents a value of a field that is in the first DCI and that is used to carry the second indication information. It may be learned that the value is inverted once at intervals of three pieces of DCI. Therefore, it may be considered that the inversion interval is 3. Alternatively, in another understanding manner, because the value is inverted once at intervals of three pieces of DCI, it may be considered that a quantity of times of consecutive and repeated sending is 3. In a specific implementation process, different expression manners may be used. This is not limited in this embodiment of this application.

In this embodiment of this application, the inversion interval may be set to be greater than or equal to 2, for example, may be set to 2, 3, 4, or another value. In other words, the plurality of pieces of consecutively transmitted DCI including the first DCI and the quantity of times of consecutive and repeated sending having a same value as the field that is in the first DCI and that is used to carry the second indication information needs to be greater than or equal to a predetermined threshold, and the predetermined threshold is the specified inversion interval. In the manner of setting the inversion interval by using the predetermined threshold, in some cases in which detection of the first DCI is missed due to missed detection of a PDCCH, the terminal device can still correctly determine whether second information is inverted. For example, values of fields used to carry the second indication information are successively 111000111000. Because detection of a middle 0 is missed due to missed detection of a PDCCH, values received by the terminal device are successively 11100111000. However, this case does not affect determining, by the terminal device, whether the second information is inverted, and therefore timing starting or timing resetting of the inactivity timer is not affected.

As described above, the first indication information may be carried by using the NDI field in the first DCI. Therefore, the first DCI may be used to schedule new data transmission or data retransmission. When the first DCI is used to schedule new data transmission, that is, when the value of the NDI field in the first DCI is different from the value of the field in the previous piece of DCI of the first DCI, the operation mode that is of the inactivity timer and that is indicated by the second indication information may be continuing timing, stopping timing, or starting timing. When the first DCI is used to schedule data retransmission. That is, when the value of the NDI field in the first DCI is the same as the value of the field in the previous piece of DCI of the first DCI, the operation mode that is of the inactivity timer and that is indicated by the second indication information may be resetting timing, stopping timing, or starting timing.

In other words, when new data transmission or data retransmission is indicated by using the NDI field in the first DCI, the corresponding second indication information may explicitly indicate the foregoing specific operation mode of the inactivity timer. In comparison with an existing manner of implicitly indicating, by using the NDI, the inactivity timer to start timing or reset timing, flexibility of indicating a timing operation of the inactivity timer can be improved, to balance scheduling flexibility and power consumption of the terminal device as much as possible, and reduce power consumption of the terminal device as much as possible while ensuring timely and effective data transmission, so that power of the terminal device is saved and a device battery life of the terminal device is prolonged.

Regardless of specific fields used by the network device to carry the first indication information and the second indication information, a specific carrying manner may be pre-agreed by the network device and the terminal device. In this way, after receiving the first DCI sent by the network device, the terminal device may correctly interpret the first DCI, to implement same perception as the network device and ensure accurate information parsing.

It may be learned from the foregoing descriptions of the first indication information and the second indication information that the first DCI is DCI used to indicate data transmission and indicates the operation mode of the inactivity timer. In other words, in comparison with a current technology, the DCI in this embodiment of this application may explicitly indicate the operation mode of the inactivity timer, unlike the current technology in which the inactivity timer is restarted to restart timing as long as the DCI used to indicate data scheduling is received. According to the solution in which the operation mode of the inactivity timer is explicitly indicated in the DCI used to indicate data transmission, an implicit indication relationship in the current technology that the DCI used to indicate data transmission definitely corresponds to restarting of the inactivity timer can be decoupled, and scheduling flexibility can be improved by using different operation modes of the inactivity timer. For example, the network device may indicate, when an amount of remaining data that needs to be buffered decreases, an operation mode of continuing timing by keeping a current timing value, or may indicate, when no data needs to continue to be buffered, an operation mode of stopping timing. In this way, scheduling flexibility and power consumption of the terminal device can be balanced as much as possible, and power consumption of the terminal device can be reduced as much as possible while ensuring timely and effective data transmission.

S34. The network device sends the first DCI to the terminal device, and the terminal device may receive the first DCI sent by the network device.

In a specific implementation process, the network device may send the first DCI by using a PDCCH. Therefore, the terminal device may receive the first DCI by detecting the PDCCH. That the terminal device detects the PDCCH may actually be understood as detecting DCI sent by using the PDCCH, for example, the first DCI in this embodiment of this application.

The network device may maintain timing of the inactivity timer in the terminal device, and therefore may know a real-time timing status of the inactivity timer in the terminal device. In a possible implementation, the network device may send the first DCI to the terminal device in a DRX active time of the terminal device, where the DRX active time is a process in which the terminal device is in an active state, or in other words, a time length corresponding to the active state. In this way, the terminal device can detect the first DCI, so that missed detection due to the terminal device not detecting a PDCCH can be avoided. In another possible implementation, the network device may further send the first DCI to the terminal device in a timing process of the drx-HARQ RTT timerDL, so that the terminal device can more quickly detect retransmission scheduling, thereby reducing a retransmission delay.

S35. The terminal device determines the operation mode of the inactivity timer in DRX based on an indication of the first DCI.

After receiving the first DCI sent by the network device, the terminal device may first determine, based on the first indication information carried in the first DCI, that received DCI is DCI used to indicate data transmission, and may further determine, based on the second indication information carried in the first DCI, the operation mode that is of the inactivity timer and that is indicated by the network device.

S36. The terminal device controls the inactivity timer to perform a corresponding timing operation based on the operation mode indicated by the first DCI.

After the operation mode that is of the inactivity timer and that is indicated by the network device is determined based on the first DCI, the operation mode of the inactivity timer may be correspondingly adjusted based on an indication of the network device. Specifically, for example, the inactivity timer may be controlled to perform the corresponding timing operation based on the operation mode indicated by the first DCI. Because the timing operation is performed by using the operation mode indicated by the network device, a timing mode of the inactivity timer can meet an expectation of the network device as much as possible. Because the network device performs dynamic and adaptive indication based on a buffer amount of data that actually needs to be scheduled, requirements on timely data transmission and device power consumption can be met as much as possible, to dynamically balance the two as much as possible, and further reduce power consumption of the terminal device as much as possible while meeting the requirement on timely data transmission.

As described above, the operation modes of the inactivity timer may be roughly classified into two types: triggering timing ending and triggering timing. The operation mode of triggering timing ending is an operation of triggering the inactivity timer to end timing, and the operation of triggering timing is an operation of triggering the inactivity timer to start or continue timing. After performing a triggering timing operation, the inactivity timer may be in a timing state. Once the inactivity timer starts timing, the terminal device may enter an off state only after timing of the inactivity timer expires. A very small amount of data may need to be transmitted during timing of the inactivity timer. Therefore, for the terminal device, it is unnecessary for the inactivity timer to continuously perform timing. Because only a relatively small amount of data needs to be transmitted currently, the terminal device does not need to be in an active state for an excessively long time. In this case, to save power, the terminal device actually expects to enter the off state as early as possible. However, when the network device performs indication by using the first DCI, although the operation mode of the inactivity timer is indicated by the second indication information, after receiving the first DCI, the terminal device may determine the operation mode of the inactivity timer based on an indication of the second indication information in the first DCI and determine the timing length (the foregoing total timing value) of the inactivity timer based on the DRX configuration information mentioned in S31, and then perform a corresponding timing operation based on the indicated operation mode and the timing length of the inactivity timer.

Based on the foregoing indicated timing operation mode, the timing operation mode of the inactivity timer changes, but timing is still performed based on a fixed timing length that is of the inactivity timer and that is configured in advance. This may not be consistent with a current actual timing requirement. For example, the network device indicates to continue timing. However, because a relatively small amount of remaining data is to be transmitted, it is expected that timing is completed as soon as possible after data transmission is completed, that is, timing expires. In the manner of continuing timing by using the fixedly configured timing length of the inactivity timer, there may be a relatively long time before timing expires. Therefore, the foregoing indication manner is only a timing manner of roughly adjusting the inactivity timer, and adjustment precision is not high. In view of this, to more accurately balance a data transmission amount and device power consumption, on the basis of explicitly indicating the operation mode of the inactivity timer by using the first DCI, some explicit indications may be further performed on a timing value of the inactivity timer. For example, when a relatively small amount of data needs to be transmitted currently, the timing value of the inactivity timer may be re-indicated to shorten a time for entering the off state, so that the terminal device can enter the off state as soon as possible, thereby saving power as much as possible.

Based on the foregoing consideration, this embodiment of this application provides two manners of adjusting the timing value of the inactivity timer. For ease of understanding, the following separately describes the two manners.

Manner 1

Based on the first DCI described above, the first DCI may further carry third indication information. In this case, the first DCI carries the first indication information, the second indication information, and the third indication information. The first indication information and the second indication information have been described above. The third indication information is used to indicate the total timing value of the inactivity timer, that is, the third indication information indicates an inactivity timer value of the inactivity timer. In other words, the third indication information may be used to explicitly indicate that the total timing value of the inactivity timer needs to be adjusted, and also indicate a total timing value to be adjusted to. The total timing value indicated by the third indication information may be represented by a quantity of time units described above.

In this embodiment of this application, the network device may configure one or more total timing values for the terminal device. If only one total timing value is configured, the inactivity timer may always use the total timing value to perform timing. In other words, the total timing value of the inactivity timer does not change during use of the inactivity timer. During communication between the network device and the terminal device, the network device may indicate the configured total timing value in an implicit indication manner by using the first DCI. For example, the implicit indication manner herein means that the total timing value is not directly explicitly indicated. For example, the first DCI carries only the first indication information and the second indication information. When determining that the first DCI carries only the first indication information and the second indication information, the terminal device determines that the total timing value of the inactivity timer is a total timing value preconfigured by the network device. If a plurality of total timing values are configured, the network device may explicitly indicate the total timing value by using the third indication information.

Figure 6A:
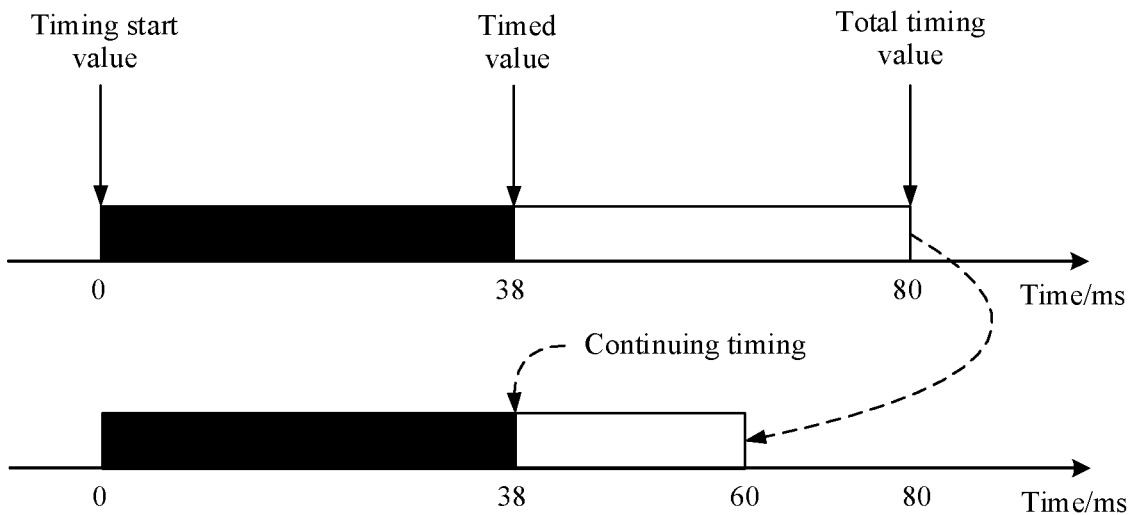
FIG. 6A is a schematic diagram of adjusting a total timing value of an inactivity timer according to an embodiment of this application.

For example, as shown in FIG. 6A, before the first DCI is received, the current timed value and the total timing value of the inactivity timer are 38 ms and 80 ms, the operation mode that is of the inactivity timer and that is indicated by the second indication information carried in the first DCI is continuing timing, and the total timing value explicitly indicated by the third indication information carried in the first DCI is 60 ms. After receiving the first DCI, the terminal device continues timing on the basis of the current timed value 38 ms, that is, a next timing moment is 39 ms, and the total timing value of the inactivity timer is adjusted from earlier 80 ms to 60 ms. As shown in FIG. 6A, an upper part of FIG. 6A is a schematic timing diagram of the inactivity timer before adjustment, and a lower part of FIG. 6A is a schematic timing diagram of the inactivity timer after adjustment is performed based on an indication of the first DCI. The total timing value of the inactivity time is reduced from 80 ms to 60 ms after the adjustment. Through the adjustment, a time length of reaching the off state is shortened. In this way, the terminal device can enter the off state as soon as possible, thereby reducing device power consumption. In addition, based on an actual timing requirement, the total timing value of the inactivity timer may be adjusted to be larger in some cases. In other words, the total timing value that is of the inactivity timer and that is indicated by the third indication information may be less than or greater than a current total timing value of the inactivity timer. Specifically, whether the total timing value is adjusted to be larger or smaller may be determined by the network device based on an actual amount of data that needs to be currently transmitted, so that adjustment flexibility can be improved.

Figure 6B:
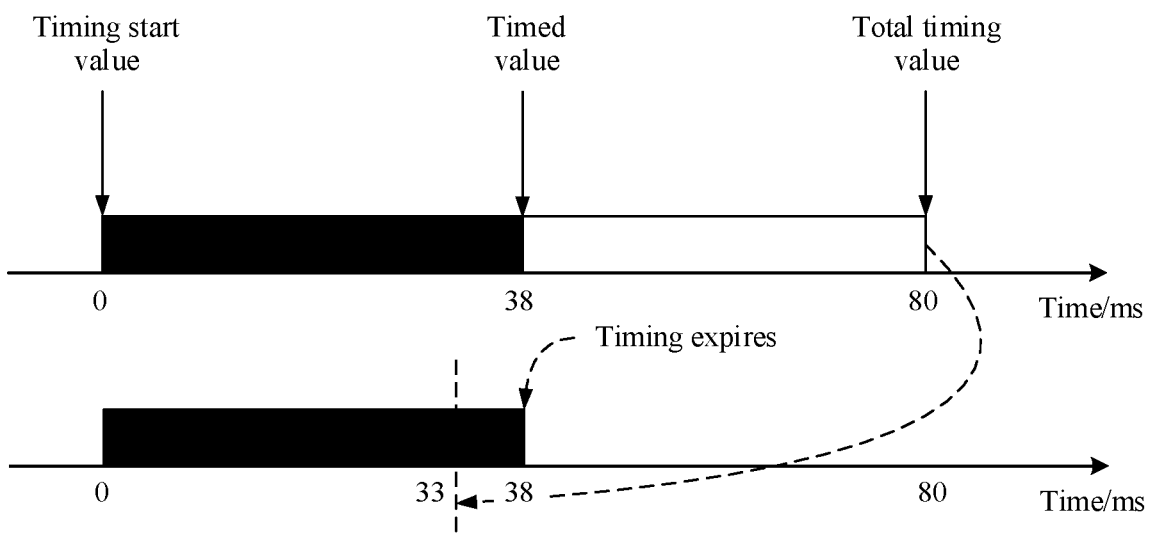
FIG. 6B is another schematic diagram of adjusting a total timing value of an inactivity timer according to an embodiment of this application.

In a possible implementation, if the total timing value indicated by the third indication information is less than the current timed value of the inactivity timer, referring to FIG. 6B, a total timing value to be adjusted to that is of the inactivity timer and that is indicated by the third indication information is 33 ms, and is less than the current timed value 38 ms of the inactivity timer. In this case, the terminal device may consider that timing of the inactivity timer expires. In other words, in a process in which the network device indicates the total timing value of the inactivity timer, if some logic errors, for example, the indicated total timing value is less than the current timed value of the inactivity timer, occur, the network device and the terminal device may pre-agree to consider such logic error as expiration of timing of the timer. In this way, normal use of the inactivity timer is not affected as much as possible. After this solution is used, a system is tolerant of a logic indication error shown in FIG. 6B. The terminal device may consider, based on the pre-agreement, that timing of the inactivity timer expires, and then enter the off state. In this manner, a fault tolerance capability of the system can be improved, and system reliability is improved.

Generally, that the total timing value indicated by the third indication information is less than or equal to the timed value of the inactivity timer should be understood as an incorrect indication because such an indication is illogical. However, if this is understood as an incorrect logic indication, abnormal running of the inactivity timer may be caused. Therefore, in this solution, when the foregoing incorrect logic indication appears, it may be understood that timing of the inactivity timer expires, and a system may tolerate the foregoing incorrect logic indication. In this way, a fault tolerance capability of the system can be improved, and normal running of the inactivity timer can be further ensured, thereby improving reliability and stability of the system.

In another implementation, the total timing value indicated by the third indication information may be the same as the current total timing value of the inactivity timer. In this case, the terminal device may no longer need to adjust the total timing value of the inactivity timer.

In a specific implementation process, the second indication information and the third indication information may be separately indicated by using different fields in the first DCI. Alternatively, both the second indication information and the third indication information may be jointly indicated by using different fields, and fields for joint indication of the second indication information and the third indication information may be the same or may be different. The joint indication herein may be understood as indication performed by using values represented by combining bits in different fields. Alternatively, the second indication information and the third indication information may be indicated by using a value of a same field in the first DCI, or in other words, the second indication information and the third indication information may be indicated by using one value of one field. Alternatively, the second indication information and the third indication information may be separately indicated by using different bits in a same field in the first DCI, or the like. In addition, fields used to indicate the second indication information and the third indication information may reuse some existing fields in the existing DCI format, or may be some fields newly added on the basis of the existing DCI format. This is not limited in this embodiment of this application.

This embodiment of this application provides a plurality of manners of indicating the second indication information and the third indication information, to improve indication flexibility, and flexibly use a field and a bit in the first DCI based on an actual situation, thereby enhancing applicability of the solution.

Manner 2

Based on the first DCI described above, the first DCI may further carry fourth indication information. In this case, the first DCI carries the first indication information, the second indication information, and the fourth indication information. The first indication information and the second indication information have been described above, and the fourth indication information is used to indicate the timed value of the inactivity timer. In other words, the fourth indication information may be used to explicitly indicate that the timed value of the inactivity timer needs to be adjusted, and indicate a timed value to be adjusted to. The timed value indicated by the fourth indication information may be represented by a quantity of time units described above.

In this embodiment of this application, the network device may configure a plurality of timed values for the terminal device, and explicitly indicate, by using the fourth indication information, the timed value that is of the inactivity timer and that currently needs to be adjusted. The timed value indicated by the fourth indication information may be a quantity of time units described above, for example, 30 ms. Alternatively, the timed value indicated by the fourth indication information may be a timed proportion value, and the timed proportion value is used to indicate a proportion of the total timing value of the inactivity timer. For example, the timed proportion value is 60%, ⅓, or 0.7. After the timed proportion value is known, the correspondingly indicated timed value may be calculated in a calculation manner of "indicated timed value=total timing value of the inactivity timer*timed proportion value". In addition, because the timed value calculated in the calculation manner may not be an integer, an integral timed value may be obtained through rounding up or down.

Figure 7A:
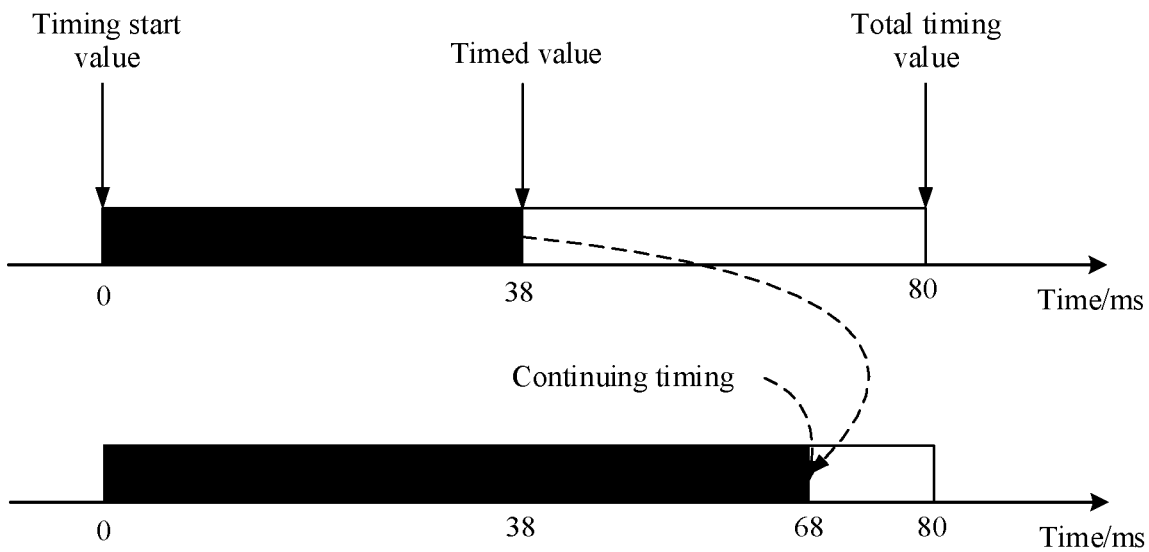
FIG. 7A is a schematic diagram of adjusting a timed value of an inactivity timer according to an embodiment of this application.

For example, as shown in FIG. 7A, before the first DCI is received, the current timed value and the total timing value of the inactivity timer are 38 ms and 80 ms, the operation mode that is of the inactivity timer and that is indicated by the second indication information carried in the first DCI is continuing timing, and the timed value explicitly indicated by the fourth indication information carried in the first DCI is 68 ms. After receiving the first DCI, the terminal device adjusts the current timed value from 38 ms to 68 ms, and then continues timing from 68 ms. After the adjustment, a time length of reaching the off state is shortened, so that the terminal device can enter the off state as soon as possible, thereby reducing device power consumption. In addition, based on an actual timing requirement, the timed value of the inactivity timer may be adjusted to be smaller in some cases. In other words, the total timing value that is of the inactivity timer and that is indicated by the fourth indication information may be greater than or less than the current timed value of the inactivity timer. Specifically, whether the timed value is adjusted to be larger or smaller may be determined by the network device based on an actual amount of data that needs to be currently transmitted, so that adjustment flexibility can be improved.

Figure 7B:
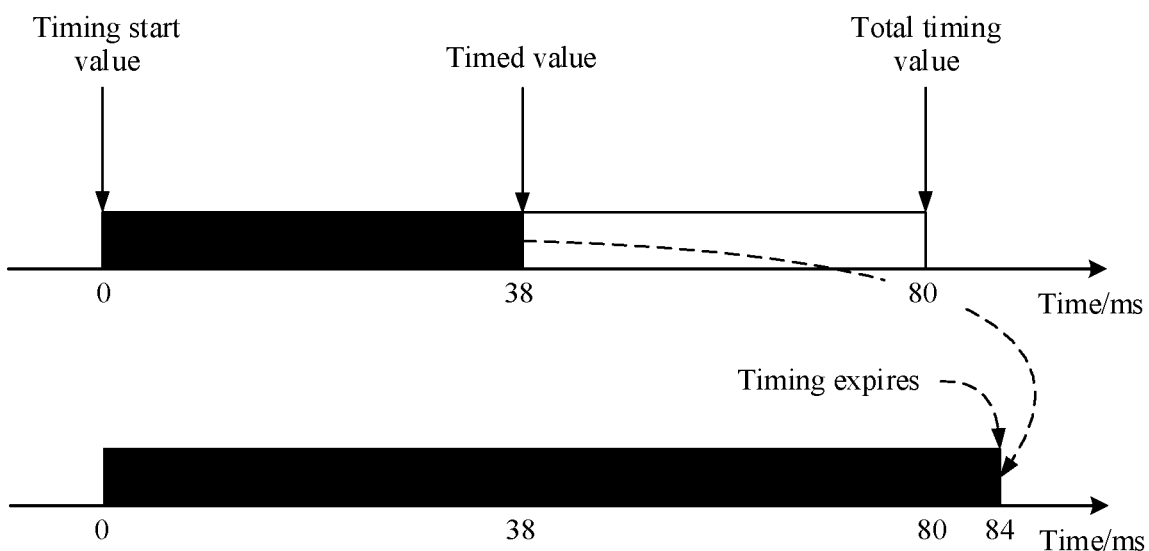
FIG. 7B is another schematic diagram of adjusting a timed value of an inactivity timer according to an embodiment of this application.

Referring to FIG. 7B, similar to FIG. 6B described above, when the timed value 84 ms that is of the inactivity timer and that is indicated by the fourth indication information is greater than the total timing value 80 ms of the inactivity timer, it indicates that timing of the inactivity timer expires. Generally, that the timed value indicated by the fourth indication information is greater than or equal to the total timing value of the inactivity timer should be understood as an incorrect indication because such an indication is illogical. However, if this is understood as an incorrect logic indication, abnormal running of the inactivity timer may be caused. Therefore, in this solution, when the foregoing incorrect logic indication appears, it may be understood that timing of the inactivity timer expires, and a system may tolerate the foregoing incorrect logic indication. In this way, a fault tolerance capability of the system can be improved, and normal running of the inactivity timer can be further ensured, thereby improving reliability and stability of the system.

In another implementation, the total timing value indicated by the fourth indication information may be the same as the current timed value of the inactivity timer. In this case, the terminal device may no longer need to adjust the timed value of the inactivity timer.

In a specific implementation process, the second indication information and the fourth indication information may be separately indicated by using different fields in the first DCI. Alternatively, both the second indication information and the fourth indication information may be jointly indicated by using different fields, and fields for joint indication of the second indication information and the fourth indication information may be the same or may be different. The joint indication herein may be understood as indication performed by using values represented by combining bits in different fields. Alternatively, the second indication information and the fourth indication information may be indicated by using a value of a same field in the first DCI, or in other words, the second indication information and the fourth indication information may be indicated by using one value of one field. Alternatively, the second indication information and the fourth indication information may be separately indicated by using different bits in a same field in the first DCI, or the like. In addition, fields used to indicate the second indication information and the fourth indication information may reuse some existing fields in the existing DCI format, or may be some fields newly added on the basis of the existing DCI format. This is not limited in this embodiment of this application. This embodiment of this application provides a plurality of manners of indicating the second indication information and the fourth indication information, to improve indication flexibility, and flexibly use a field and a bit in the first DCI based on an actual situation.

Figure 8:
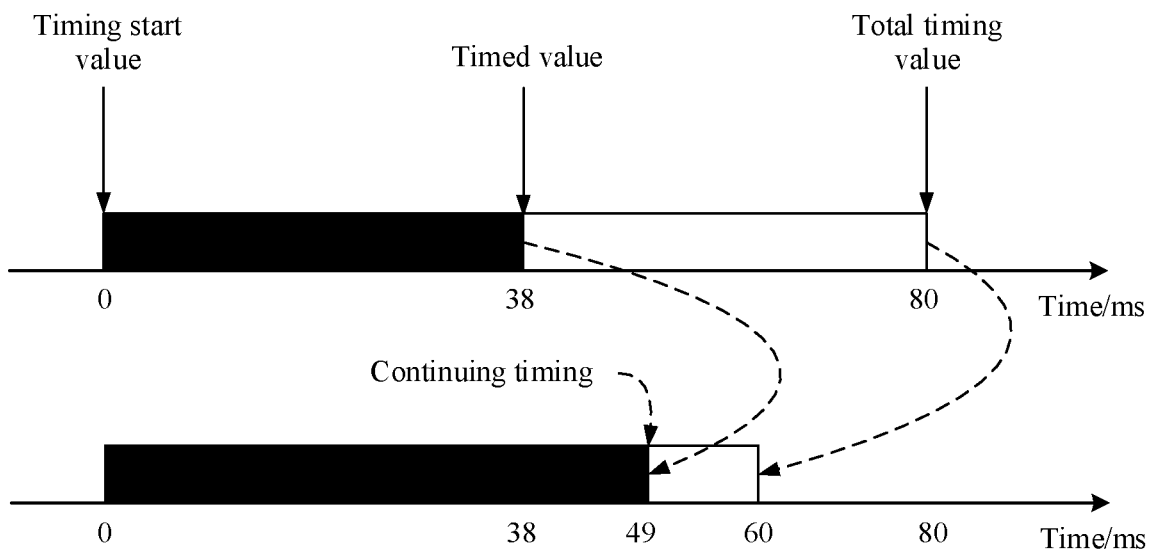
FIG. 8 is a schematic diagram of adjusting both a total timing value and a timed value of an inactivity timer according to an embodiment of this application.

In another possible implementation, the first DCI may alternatively carry the first indication information, the second indication information, the third indication information, and the fourth indication information. As shown in FIG. 8, before the first DCI is received, the current timed value and the total timing value of the inactivity timer are 38 ms and 80 ms, the operation mode that is of the inactivity timer and that is indicated by the second indication information carried in the first DCI is continuing timing, the total timing value explicitly indicated by the third indication information carried in the first DCI is 60 ms, and the timed value explicitly indicated by the fourth indication information carried in the first DCI is 49 ms, Referring to comparison of timing of the inactivity timer before and after adjustment in FIG. 8, a time length of reaching the off state is shortened twofold by using the third indication information and the fourth indication information, so that the terminal device can enter the off state relatively quickly, to reduce power consumption of the terminal device as soon as possible. FIG. 8 is merely an example in which four types of indication information: the first indication information, the second indication information, the third indication information, and the fourth indication information are combined for indication. In a specific implementation process, the network device may dynamically perform different indications based on an amount of data that needs to be transmitted. Details are not described herein.

The first DCI in this embodiment of this application may be transmitted in an associated search space. As described above, the first DCI may be in any one of format 0_0, format 0_1, format 1_0, and format 1_1, and DCI in these different formats are associated by corresponding search spaces. Therefore, DCI in corresponding formats may be searched in these associated search spaces. In addition, a configuration message for configuring the associated search space may carry at least one of the second indication information, the third indication information, or the fourth indication information. Because the second indication information, the third indication information, or the fourth indication information is indication information used to indicate that the first DCI in this application is different from existing DCI. In other words, based on the existing DCI, in this embodiment of this application, the second indication information, the third indication information, and the fourth indication information may be used to explicitly indicate some information related to timing of the inactivity timer, and some new indication functions are added in comparison with the existing DCI. Therefore, when the first DCI is being interpreted, the first DCI needs to be interpreted in a new interpretation manner. To implement perception unification between the terminal and the network, the network device may notify, by using an RRC configuration message, the terminal device that the new interpretation manner in this embodiment of this application needs to be used to interpret subsequently received first DCI. It is simply understood that the network device may notify, by using the RRC configuration message, the terminal device that the first DCI is DCI that can indicate at least one of the operation mode of the inactivity timer (indicated by using the second indication information), the total timing value of the inactivity timer (indicated by using the third indication information), and the timed value of the inactivity timer (indicated by using the fourth indication information). Further, the terminal device may implement perception unification with the network device based on the RRC configuration message, to ensure accurate information exchange between the terminal and the network.

In another implementation, whether DCI has the foregoing new indication function may be directly indicated to the terminal device based on a type of a search space. Specifically, if a search space associated with a specified piece of DCI is a user equipment-specific search space (UE-specific search space, USS), that is, if the DCI is transmitted in the USS, it indicates that the DCI has the foregoing new indication function. In this case, the DCI carries at least one of the second indication information, the third indication information, and the fourth indication information. If a search space associated with a specified piece of DCI is a common search space (common search space, CSS), that is, if the DCI is transmitted in the CSS, it indicates that the DCI does not have the foregoing new indication function, and may be DCI in a current technology. In this case, the DCI does not carry any one of the second indication information, the third indication information, and the fourth indication information. Because the first DCI in this embodiment of this application is DCI with the foregoing new function, based on the technical solution, the first DCI is transmitted in the USS, but is not transmitted in the CSS. In a manner of indicating, by using the type of the search space, whether transmitted DCI has the foregoing new function, signaling overheads of DCI that is transmitted in a CSS-type search space and that does not require the foregoing new function can be reduced.

Figure 9:
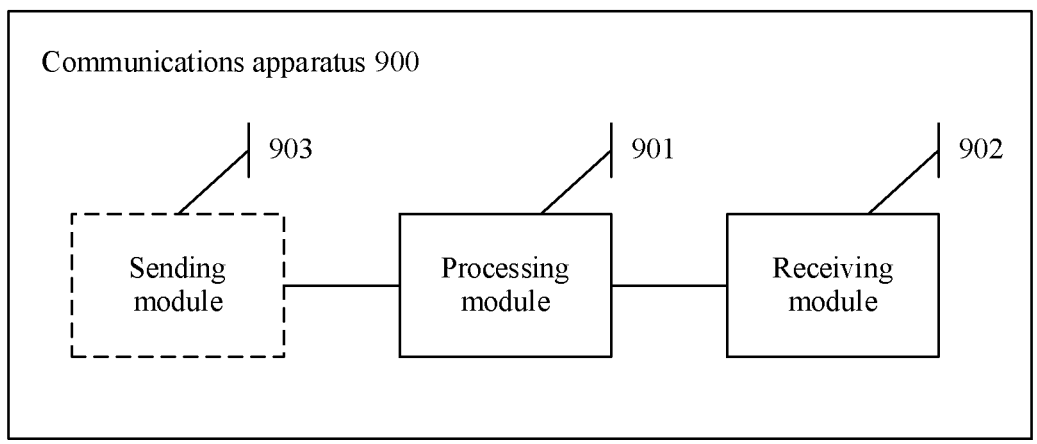
FIG. 9 is a structural block diagram of a communications apparatus according to an embodiment of this application.

Based on a same inventive concept, referring to FIG. 9, an embodiment of this application provides a communications apparatus 900. The communications apparatus 900 may be a terminal device, and can implement functions of the terminal device in the information transmission method provided in the embodiments of this application; or the communications apparatus 900 may be an apparatus that can support the terminal device in implementing functions of the terminal device in the information transmission method provided in the embodiments of this application. The communications apparatus 900 may be a hardware structure, a software module, or a hardware structure and a software module. The communications apparatus 900 may be implemented by a chip system. In this embodiment of this application, the chip system may include a chip, or may include a chip and another discrete device. As shown in FIG. 9, the communications apparatus 900 may include a processing module 901, a receiving module 902, and a sending module 903. The sending module 903 may not be a mandatory module, and therefore is represented by dashed lines in FIG. 9. The receiving module 902 and the sending module 903 are used by the communications apparatus 900 to communicate with another module, and may be a circuit, a device, an interface, a bus, a software module, a transceiver, or any other apparatus that can implement communication.

The processing module 901 may be configured to perform S32, S35, and S36 in the embodiment shown in FIG. 3, and/or configured to support another process of the technology described in this specification. The receiving module 902 may be configured to perform S34 in the embodiment shown in FIG. 3, and/or configured to support another process of the technology described in this specification. In a specific implementation process, the receiving module 902 and the sending module 903 may perform a corresponding communication function under control of the processing module 901.

The receiving module 902 may receive first DCI sent by a network device, where the first DCI carries first indication information and second indication information, the first indication information is used to indicate data transmission, and the second indication information is used to indicate an operation mode of an inactivity timer in DRX.

The processing module 901 may determine the operation mode of the inactivity timer based on an indication of the first DCI. In a possible implementation, the processor 901 may further control the inactivity timer to perform a corresponding timing operation based on the operation mode indicated by the first DCI.

Figure 10:
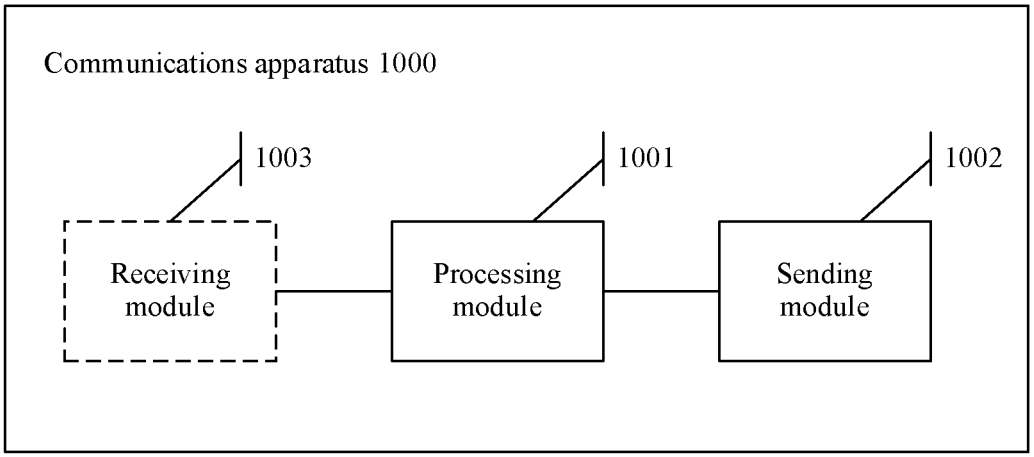
FIG. 10 is another structural block diagram of a communications apparatus according to an embodiment of this application.

In a specific implementation process, the receiving module 902 and the sending module 903 may be separately disposed, or in other words, are two independent function modules in this case. In a possible implementation, the receiving module 902 and the sending module 903 may be disposed as one function module in an integrated manner, for example, disposed as one transceiver module. The transceiver module has a capability of the receiving module 902 to receive information, and also has a capability of the sending module 903 to send information. Based on a same inventive concept, referring to FIG. 10, an embodiment of this application provides a communications apparatus 1000. The communications apparatus 1000 may be a network device, and can implement functions of the network device in the information transmission method provided in the embodiments of this application; or the communications apparatus 1000 may be an apparatus that can support the network device in implementing functions of the network device in the information transmission method provided in the embodiments of this application. The communications apparatus 1000 may be a hardware structure, a software module, or a hardware structure and a software module. The communications apparatus 1000 may be implemented by a chip system. In this embodiment of this application, the chip system may include a chip, or may include a chip and another discrete device. As shown in FIG. 10, the communications apparatus 1000 may include a processing module 1001, a sending module 1002, and a receiving module 1003. The receiving module 1003 may not be a mandatory module, and therefore is represented by dashed lines in FIG. 10. The sending module 1002 and the receiving module 1003 are used by the communications apparatus 1000 to communicate with another module, and may be a circuit, a device, an interface, a bus, a software module, a transceiver, or any other apparatus that can implement communication.

The processing module 1001 may be configured to perform S33 in the embodiment shown in FIG. 3, and/or configured to support another process of the technology described in this specification. The sending module 1002 may be configured to perform S31 and S34 in the embodiment shown in FIG. 3, and/or configured to support another process of the technology described in this specification. In a specific implementation process, the sending module 1002 and the receiving module 1003 may perform a corresponding communication function under control of the processing module 1001.

The processing module 1001 may determine first DCI, where the first DCI carries first indication information and second indication information, the first indication information is used to indicate data transmission, and the second indication information is used to indicate an operation mode of an inactivity timer.

The sending module 1002 may send the first DCI to a terminal device.

In a specific implementation process, the sending module 1002 and the receiving module 1003 may be separately disposed, or in other words, are two independent function modules in this case. In a possible implementation, the sending module 1002 and the receiving module 1003 may be disposed as one function module in an integrated manner, for example, disposed as one transceiver module. The transceiver module has a capability of the receiving module 1003 to receive information, and also has a capability of the sending module 1002 to send information.

All content related to the steps in the foregoing method embodiments may be cited in function descriptions of corresponding function modules. Details are not described herein again.

Module division in this embodiment of this application is an example, is merely logical function division, and may be another division in actual implementation. In addition, function modules in the embodiments of this application may be integrated in one processor, or each of the modules may exist alone physically, or two or more modules are integrated in one module. The integrated module may be implemented in a form of hardware, or may be implemented in a form of a software function module.

Figure 11:
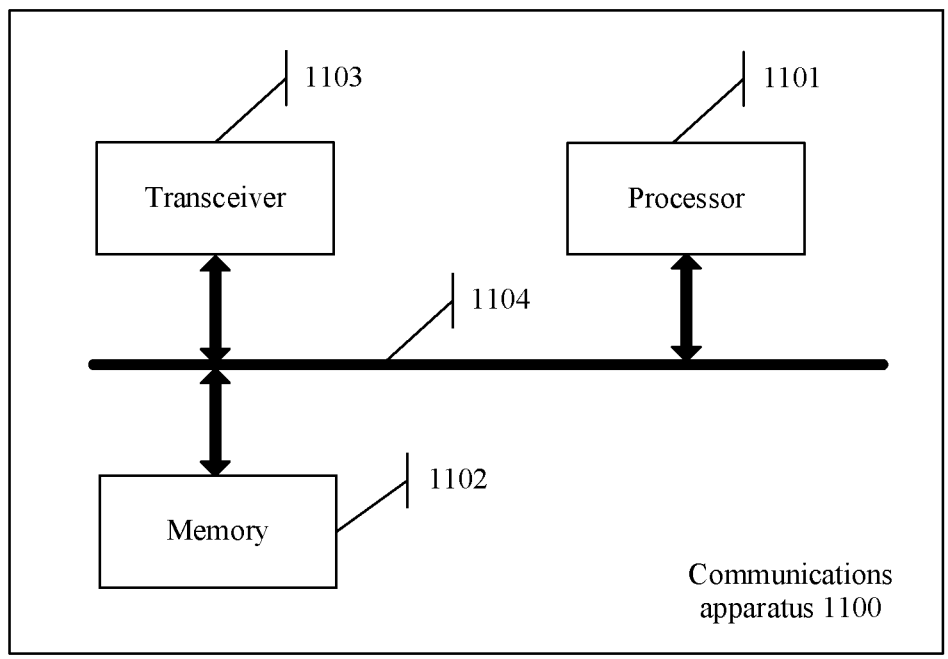
FIG. 11 is a schematic structural diagram of a communications apparatus according to an embodiment of this application.

Based on a same concept, referring to FIG. 11, an embodiment of this application provides a communications apparatus 1100. FIG. 11 is a schematic structural diagram of the communications apparatus 1100 provided in this embodiment of this application. The communications apparatus 1100 may be a terminal device, and can implement functions of the terminal device in the information transmission method provided in the embodiments of this application; or the communications apparatus 1100 may be an apparatus that can support a terminal device in implementing functions of the terminal device in the information transmission method provided in the embodiments of this application. The communications apparatus 1100 may be a chip system. In this embodiment of this application, the chip system may include a chip, or may include a chip and another discrete device.

The communications apparatus 1100 includes at least one processor 1101, configured to implement or support the apparatus in implementing functions of the terminal device in the information transmission method provided in the embodiments of this application.

The communications apparatus 1100 may further include at least one memory 1102, configured to store program instructions and/or data. The memory 1102 is coupled to the processor 1101. The coupling in this embodiment of this application is an indirect coupling or a communication connection between apparatuses, units, or modules, may be implemented in electrical, mechanical, or another form, and is used for information exchange between the apparatuses, the units, or the modules. The processor 1101 may operate in cooperation with the memory 1102. The processor 1101 may execute the program instructions stored in the memory 1102. At least one of the at least one memory may be included in the processor.

The communications apparatus 1100 may further include a transceiver 1103, configured to communicate with another device by using a transmission medium, so that the communications apparatus 1100 can communicate with the another device. The processor 1101 may use the transceiver 1103 to receive and send data. For example, the transceiver 1103 may correspond to the receiving module 902 and the sending module 903 in FIG. 9. The transceiver 1103 may be specifically some communications interfaces.

In this embodiment of this application, a specific connection medium between the transceiver 1103, the processor 1101, and the memory 1102 is not limited. In this embodiment of this application, the memory 1102, the processor 1101, and the transceiver 1103 are connected through a bus 1104 in FIG. 11. The bus is represented by using a bold line in FIG. 11. A manner of connection between other components is merely an example for description, and imposes no limitation. The bus may be classified into an address bus, a data bus, a control bus, and the like. For ease of representation, only one thick line is used to represent the bus in FIG. 11, but this does not mean that there is only one bus or only one type of bus.

Figure 12:
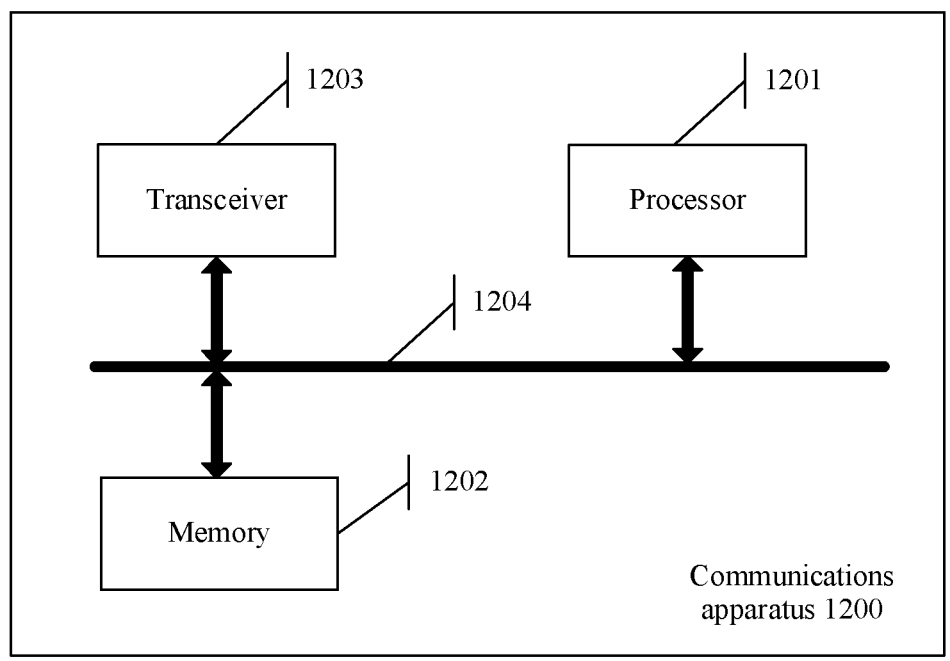
FIG. 12 is another schematic structural diagram of a communications apparatus according to an embodiment of this application.

Based on a same concept, referring to FIG. 12, an embodiment of this application provides a communications apparatus 1200. FIG. 12 is a schematic structural diagram of the communications apparatus 1200 provided in this embodiment of this application. The communications apparatus 1200 may be a network device, and can implement functions of the network device in the information transmission method provided in the embodiments of this application; or the communications apparatus 1200 may be an apparatus that can support a network device in implementing functions of the network device in the information transmission method provided in the embodiments of this application. The communications apparatus 1200 may be a chip system. In this embodiment of this application, the chip system may include a chip, or may include a chip and another discrete device.

The communications apparatus 1200 includes at least one processor 1201, configured to implement or support the apparatus in implementing functions of the network device in the information transmission method provided in the embodiments of this application.

The communications apparatus 1200 may further include at least one memory 1202, configured to store program instructions and/or data. The memory 1202 is coupled to the processor 1201. The coupling in this embodiment of this application is an indirect coupling or a communication connection between apparatuses, units, or modules, may be implemented in electrical, mechanical, or another form, and is used for information exchange between the apparatuses, the units, or the modules. The processor 1201 may operate in cooperation with the memory 1202. The processor 1201 may execute the program instructions stored in the memory 1202. At least one of the at least one memory may be included in the processor.

The communications apparatus 1200 may further include a transceiver 1203, configured to communicate with another device by using a transmission medium, so that the communications apparatus 1200 can communicate with the another device. The processor 1201 may use the transceiver 1203 to receive and send data. For example, the transceiver 1203 may correspond to the sending module 1002 and the receiving module 1003 in FIG. 10. The transceiver 1203 may be specifically some communications interfaces.

In this embodiment of this application, a specific connection medium between the transceiver 1203, the processor 1201, and the memory 1202 is not limited. In this embodiment of this application, the memory 1202, the processor 1201, and the transceiver 1203 are connected through a bus 1204 in FIG. 12. The bus is represented by using a bold line in FIG. 12. A manner of connection between other components is merely an example for description, and imposes no limitation. The bus may be classified into an address bus, a data bus, a control bus, and the like. For ease of representation, only one thick line is used to represent the bus in FIG. 12, but this does not mean that there is only one bus or only one type of bus.

In the embodiments of this application, the processor 1101 and the processor 1201 may be general purpose processors, digital signal processors, application-specific integrated circuits, field programmable gate arrays or other programmable logic devices, discrete gates or transistor logic devices, or discrete hardware components, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed and completed by a hardware processor, or may be performed and completed by a combination of hardware and a software module in the processor.

In the embodiments of this application, the memory 1102 and the memory 1202 each may be a non-volatile memory such as an HDD or a solid state drive SSD, or may be a volatile memory such as a random access memory RAM. The memory is any other medium that can carry or store expected program code in a form of an instruction or a data structure and that can be accessed by a computer, but is not limited thereto. The memory in the embodiments of this application may be alternatively a circuit or any other apparatus that can implement a storage function, and is configured to store program instructions and/or data.

An embodiment of this application further provides a computer-readable storage medium. The computer-readable storage medium includes computer instructions. When the computer instructions are run on a computer, the computer is enabled to perform the information transmission method in the embodiments of this application.

An embodiment of this application further provides a chip system. The chip system includes a processor, and may further include a memory, configured to implement the information transmission method in the embodiments of this application. The chip system may include a chip, or may include a chip and another discrete device.

An embodiment of this application further provides a communications system. The communications system includes the communications apparatus 900 in FIG. 9 and the communications apparatus 1000 in FIG. 10.

An embodiment of this application further provides another communications system. The communications system includes the communications apparatus 1100 in FIG. 11 and the communications apparatus 1200 in FIG. 12.

An embodiment of this application further provides a computer program product including instructions. The computer program product stores the instructions, and when the instructions are run on a computer, the computer is enabled to perform the information transmission method in the embodiments of this application. The foregoing embodiments are merely used to describe the technical solutions of this application in detail. The foregoing embodiments are merely intended to help understand the method of the embodiments of the present invention, and shall not be construed as a limitation on the embodiments of the present invention. Variations or replacements readily figured out by a person skilled in the art shall fall within the protection scope of the embodiments of the present invention.

What is claimed is:

1. An information receiving method, wherein the method comprises:
    receiving, by a terminal device, first downlink control information (DCI) sent by a network device, wherein the first DCI carries first indication information and second indication information, the first indication information is used to indicate data transmission, and the second indication information is used to indicate an operation mode of an inactivity timer in discontinuous reception DRX; and
    determining, by the terminal device, the operation mode of the inactivity timer based on the second indication information of the first DCI;
    wherein the operation mode of the inactivity timer comprises any one of the following: starting timing, stopping timing, resetting timing, or continuing timing; and
    wherein the second indication information is explicitly indicated in the first DCI, and the first DCI is used to schedule new data transmission or data retransmission; and a new data indicator (NIDI) field in the first DCI carries the first indication information, and a field in the first DCI other than the NDI field carries the second indication information.

2. The method according to claim 1, wherein
    when the first DCI is used to schedule new data transmission, the second indication information indicates that the operation mode of the inactivity timer is continuing timing, stopping timing, or starting timing; or
    when the first DCI is used to schedule data retransmission, the second indication information is used to indicate that the operation mode of the inactivity timer is resetting timing, stopping timing, or starting timing.

3. The method according to claim 1, wherein the first DCI further carries third indication information, the third indication information is used to indicate a total timing value of the inactivity timer, and the total timing value indicated by the third indication information is one of a plurality of total timing values configured by the network device for the terminal device.

4. The method according to claim 1, wherein the first DCI further carries fourth indication information, and the fourth indication information is used to indicate a timed value of the inactivity timer.

5. The method according to claim 1, wherein the second indication information is used for indication based on whether a value of a field in the first DCI is the same as a value of the field in a previous piece of DCI of the first DCI; and
    if the values are the same, the second indication information indicates that the operation mode of the inactivity timer is stopping timing or continuing timing, and if the values are different, the second indication information indicates that the operation mode of the inactivity timer is starting timing or resetting timing; or
    if the values are the same, the second indication information indicates that the operation mode of the inactivity timer is starting timing or resetting timing, and if the values are different, the second indication information indicates that the operation mode of the inactivity timer is stopping timing or continuing timing.

6. An information transmission method, wherein the method comprises:
    determining, by a network device, first downlink control information (DCI), wherein the first DCI carries first indication information and second indication information, the first indication information is used to indicate data transmission, and the second indication information is used to indicate an operation mode of an inactivity timer in discontinuous reception (DRX); and
    sending, by the network device, the first DCI to a terminal device;
    wherein the operation mode of the inactivity timer comprises any one of the following: starting timing, stopping timing, resetting timing, and continuing timing; and
    wherein the second indication information is explicitly indicated in the first DCI, and the first DCI is used to schedule new data transmission or data retransmission; and a new data indicator (NIDI) field in the first DCI carries the first indication information, and a field in the first DCI other than the NDI field carries the second indication information.

7. The method according to claim 6, wherein
    when the first DCI is used to schedule new data transmission, the second indication information indicates that the operation mode of the inactivity timer is continuing timing, stopping timing, or starting timing; or
    when the first DCI is used to schedule data retransmission, the second indication information is used to indicate that the operation mode of the inactivity timer is resetting timing, stopping timing, or starting timing.

8. The method according to claim 6, wherein the first DCI further carries third indication information, the third indication information is used to indicate a total timing value of the inactivity timer, and the total timing value indicated by the third indication information is one of a plurality of total timing values configured by the network device for the terminal device.

9. The method according to claim 6, wherein the first DCI further carries fourth indication information, and the fourth indication information is used to indicate a timed value of the inactivity timer.

10. The method according to claim 6, wherein the second indication information is used for indication based on whether a value of a field in the first DCI is the same as a value of the field in a previous piece of DCI of the first DCI; and
    if the values are the same, the second indication information indicates that the operation mode of the inactivity timer is stopping timing or continuing timing, and if the values are different, the second indication information indicates that the operation mode of the inactivity timer is starting timing or resetting timing; or
    if the values are the same, the second indication information indicates that the operation mode of the inactivity timer is starting timing or resetting timing, and if the values are different, the second indication information indicates that the operation mode of the inactivity timer is stopping timing or continuing timing.

11. A communications apparatus, wherein the communications apparatus comprises:
    a transceiver, configured to receive first downlink control information (DCI) sent by a network device, wherein the first DCI carries first indication information and second indication information, the first indication information is used to indicate data transmission, and the second indication information is used to indicate an operation mode of an inactivity timer in discontinuous reception (DRX); and a processor, configured to determine the operation mode of the inactivity timer based on an indication of the first DCI;

wherein the operation mode of the inactivity timer comprises any one of the following: starting timing, stopping timing, resetting timing, and continuing timing;

wherein the second indication information is explicitly indicated in the first DCI, and the first DCI is used to schedule new data transmission or data retransmission; and a new data indicator (NIDI) field in the first DCI carries the first indication information, and a field in the first DCI other than the NDI field carries the second indication information.

12. The communications apparatus according to claim 11, wherein when the first DCI is used to schedule new data transmission, the second indication information indicates that the operation mode of the inactivity timer is continuing timing, stopping timing, or starting timing; or when the first DCI is used to schedule data retransmission, the second indication information is used to indicate that the operation mode of the inactivity timer is resetting timing, stopping timing, or starting timing.

13. The communications apparatus according to claim 11, wherein the first DCI further carries third indication information, the third indication information is used to indicate a total timing value of the inactivity timer, and the total timing value indicated by the third indication information is one of a plurality of total timing values configured by the network device for the terminal device.

14. The communications apparatus according to claim 11, wherein the first DCI further carries fourth indication information, and the fourth indication information is used to indicate a timed value of the inactivity timer.

15. The communications apparatus according to claim 11, wherein the second indication information is used for indication based on whether a value of a field in the first DCI is the same as a value of the field in a previous piece of DCI of the first DCI; and if the values are the same, the second indication information indicates that the operation mode of the inactivity timer is stopping timing or continuing timing, and if the values are different, the second indication information indicates that the operation mode of the inactivity timer is starting timing or resetting timing; or if the values are the same, the second indication information indicates that the operation mode of the inactivity timer is starting timing or resetting timing, and if the values are different, the second indication information indicates that the operation mode of the inactivity timer is stopping timing or continuing timing.

16. A communications apparatus, wherein the communications apparatus comprises:

a processor, configured to determine first downlink control information (DCI), wherein the first DCI carries first indication information and second indication information, the first indication information is used to indicate data transmission, and the second indication information is used to indicate an operation mode of an inactivity timer in discontinuous reception (DRX); and a transceiver, configured to send the first DCI to a terminal device;

wherein the operation mode of the inactivity timer comprises any one of the following: starting timing, stopping timing, resetting timing, and continuing timing; and wherein the second indication information is explicitly indicated in the first DCI, and the first DCI is used to schedule new data transmission or data retransmission;

a new data indicator (NDI) field in the first DCI carries the first indication information, and a field in the first DCI other than the NDI field carries the second indication information.

17. The communications apparatus according to claim 16, wherein when the first DCI is used to schedule new data transmission, the second indication information indicates that the operation mode of the inactivity timer is continuing timing, stopping timing, or starting timing; or when the first DCI is used to schedule data retransmission, the second indication information is used to indicate that the operation mode of the inactivity timer is resetting timing, stopping timing, or starting timing.

18. The communications apparatus according to claim 16, wherein the first DCI further carries third indication information, the third indication information is used to indicate a total timing value of the inactivity timer, and the total timing value indicated by the third indication information is one of a plurality of total timing values configured by the network device for the terminal device.

19. The communications apparatus according to claim 16, wherein the first DCI further carries fourth indication information, and the fourth indication information is used to indicate a timed value of the inactivity timer.

20. The communications apparatus according to claim 16, wherein the second indication information is used for indication based on whether a value of a field in the first DCI is the same as a value of the field in a previous piece of DCI of the first DCI; and if the values are the same, the second indication information indicates that the operation mode of the inactivity timer is stopping timing or continuing timing, and if the values are different, the second indication information indicates that the operation mode of the inactivity timer is starting timing or resetting timing; or if the values are the same, the second indication information indicates that the operation mode of the inactivity timer is starting timing or resetting timing, and if the values are different, the second indication information indicates that the operation mode of the inactivity timer is stopping timing or continuing timing.

* * * * *

UNITED STATES PATENT AND TRADEMARK OFFICE
CERTIFICATE OF CORRECTION

PATENT NO. : 11,991,708 B2
APPLICATION NO. : 17/245518
DATED : May 21, 2024
INVENTOR(S) : Lixia Xue et al.

Page 1 of 1

It is certified that error appears in the above-identified patent and that said Letters Patent is hereby corrected as shown below:

In the Claims

In Column 37, Line 21, in Claim 1, delete "(NIDI)" and insert -- (NDI) --.

In Column 38, Line 15, in Claim 6, delete "(NIDI)" and insert -- (NDI) --.

In Column 39, Line 11, in Claim 11, delete "(NIDI)" and insert -- (NDI) --.

Signed and Sealed this
Twenty-fourth Day of December, 2024

Derrick Brent
*Acting Director of the United States Patent and Trademark Office*